(12) United States Patent
Etheridge et al.

(10) Patent No.: US 11,145,001 B1
(45) Date of Patent: *Oct. 12, 2021

(54) INSURANCE APPLICATION PROCESS PROVIDING BOUND ONLINE COVERAGE FOR LIFE INSURANCE PRODUCTS

(71) Applicant: STATE FARM MUTUAL AUTOMOBILE INSURANCE COMPANY, Bloomington, IL (US)

(72) Inventors: David Scott Etheridge, Bloomington, IL (US); Andrew Patrick Wieduwilt, Bloomington, IL (US); Jill A. Eberle, Bloomington, IL (US); Carl R. Streily, Jr., Normal, IL (US); Randall P. Petersen, Normal, IL (US); Amy R. Prestegaard, Waynesville, IL (US); Larry J. Ingrum, Mahomet, IL (US); Lori J. Kaufman, Bloomington, IL (US); Alan R. Hendren, Le Roy, IL (US); David A. Theile, Bloomington, IL (US); Douglas K. Sorensen, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 10 days.

This patent is subject to a terminal disclaimer.

(21) Appl. No.: 16/562,543

(22) Filed: Sep. 6, 2019

Related U.S. Application Data

(63) Continuation of application No. 14/699,425, filed on Apr. 29, 2015, now Pat. No. 10,460,392.
(Continued)

(51) Int. Cl.
*G06Q 40/08* (2012.01)

(52) U.S. Cl.
CPC .................................. *G06Q 40/08* (2013.01)

(58) Field of Classification Search
CPC ............................. G06Q 40/08; G06G 40/08
(Continued)

(56) References Cited

U.S. PATENT DOCUMENTS 8,463,624 B2    6/2013  Hashim
8,577,699 B1 *  11/2013 Diener .................. G06Q 40/08
                                                      705/4

(Continued)

OTHER PUBLICATIONS

PRWeb Newswire, ANICODirect.com Provides Term Life Insurance Based on a Few Simple Health Questions With No Medical Exams—100% Online in Less Than 15 Minutes, Jul. 12, 2012, Vocus PRW Holdings LLC, Newswire from Magazine/Journal—3 pages. (Year: 2012).*

(Continued)

*Primary Examiner* — Benjamin S Brindley
(74) *Attorney, Agent, or Firm* — Randall G. Rueth

(57) ABSTRACT

Methods, systems, apparatus, and non-transitory computer readable media are disclosed for providing a web-based application that allows a customer to submit relevant information for obtaining insurance policy products that may require medical underwriting. Various aspects allow a customer to use the web-based application for a variety of insurance products, which may include term, full, and/or universal life insurance policies. The web-based application simplifies the application process by filtering questions and/or prompts presented to the customer based upon a customer's specific needs, previous answers, and/or other information. Various aspects also include determining whether a customer qualifies for temporary or permanent life insurance coverage based upon a customer's information and/or answers to one or more knockout questions, and if so, providing the customer with a binding receipt of temporary (Continued)

insurance coverage upon payment for a period of time in which the underwriting may be completed.

20 Claims, 13 Drawing Sheets

Related U.S. Application Data

(60) Provisional application No. 62/069,093, filed on Oct. 27, 2014.
(58) Field of Classification Search
USPC .......................................................... 705/4
See application file for complete search history.

(56) References Cited

U.S. PATENT DOCUMENTS

| | | |
|---|---|---|
| 8,634,540 B1 | 1/2014 | Dixon et al. |
| 8,650,043 B1 | 2/2014 | Phillips |
| 8,671,015 B1 | 3/2014 | Brandt et al. |
| 8,671,050 B1 | 3/2014 | Sandoval |
| 9,760,953 B1* | 9/2017 | Wang ................... G06Q 40/123 |
| 2003/0233260 A1* | 12/2003 | Snell ...................... G06Q 40/08 705/4 |
| 2009/0192827 A1* | 7/2009 | Andersen ............... G06Q 40/08 705/4 |
| 2011/0022420 A1* | 1/2011 | Morse .................... G16H 10/60 705/4 |
| 2012/0143634 A1 | 6/2012 | Beyda et al. |
| 2012/0271661 A1* | 10/2012 | Reynolds ............... G06Q 40/08 705/4 |
| 2012/0284058 A1* | 11/2012 | Varanasi ................ G06Q 40/08 705/4 |
| 2012/0303389 A1 | 11/2012 | Friedman |
| 2013/0035964 A1* | 2/2013 | Roscoe ................... G06Q 10/10 705/4 |
| 2013/0124294 A1 | 5/2013 | Peak et al. |
| 2013/0166325 A1* | 6/2013 | Ganapathy ............. G06Q 40/08 705/4 |
| 2013/0231964 A1* | 9/2013 | Schiminovich ...... G06Q 20/102 705/4 |
| 2013/0290023 A1* | 10/2013 | Hight ..................... G16H 50/30 705/3 |
| 2015/0339942 A1* | 11/2015 | Ben-Naim ............. G06Q 10/10 434/309 |
| 2016/0275627 A1* | 9/2016 | Wang ................... G06Q 40/123 |

OTHER PUBLICATIONS

The Grow-Up Plan Life Insurance Application: accessed at <https://www.gerberlife.com/gl/planassistant.do?success>, pp. 1-2, Mar. 4, 2014.

U.S. Appl. No. 14/699,110, Insurance Application Process Using Multiple Communication Channels, filed Apr. 29, 2015.

U.S. Appl. No. 14/699,110, Nonfinal Office Action, dated Jul. 11, 2017.

U.S. Appl. No. 14/699,425, Nonfinal Office Action, dated Sep. 25, 2017.

U.S. Appl. No. 14/699,425, Etheridge et al., "Insurance Application Process Providing Bound Online Coverage for Life Insurance Products", filed Apr. 29, 2015.

* cited by examiner

FIG. 3F

INSURANCE APPLICATION PROCESS PROVIDING BOUND ONLINE COVERAGE FOR LIFE INSURANCE PRODUCTS

CROSS REFERENCE TO RELATED APPLICATIONS

This application is a continuation application of U.S. application Ser. No. 14/699,425, entitled "Insurance Application Process Providing Bound Online Coverage For Life Insurance Products," and filed Apr. 29, 2015, which claims priority to Provisional Application No. 62/069,093, entitled "Insurance Application Process Providing Bound Online Coverage for Filing Insurance Products," and filed Oct. 27, 2014, which are incorporated herein by reference in its entirety.

FIELD OF THE DISCLOSURE

The present disclosure relates to systems, methods, apparatus, and non-transitory computer readable media for collecting customer information for insurance policy enrollment, and, more particularly, to using an online web-based application to collect customer information and potentially provide temporary (or even permanent) insurance coverage during a period in which medical underwriting may be completed.

BACKGROUND

Life insurance is commonly purchased by people to insure themselves or others in the event of a persons' death. Other types of insurance provide protection in accordance with their respective policies, which may include property, such as a person's house or car, for example. To obtain an insurance policy, a customer typically submits information to the insurer, who in turn decides whether to insure the customer, and if so, determines an appropriate premium for the issued insurance policy. The decision of whether to issue an insurance policy, as well as the premiums associated with an insurance policy, is generally based upon several risk factors determined from the submitted information. In the case of property insurance policies, these risk factors may be generally determined from the location of the insured property, people who will be operating the insured property, etc. In the case of life insurance policies, the risk factors may be typically determined from the customer's lifestyle choices (e.g., tobacco and/or alcohol consumption) the customer's age, present health conditions, family health history, occupation and/or recreational habits, driving history, credit history, and/or other suitable factors for determining a customer's potential risk of death upon issuance of the life insurance policy.

Traditionally, a customer seeking to purchase a life insurance policy visits a local agent's office. A customer may then furnish relevant information to the agent, and the agent may collect the customer's information. In some cases, an insurance provider may require a medical appointment and laboratory testing. Once all information is received, an insurance provider may utilize this information in conjunction with the originally collected customer information to further adjust the life insurance premiums (or decide to deny coverage).

Since visiting an agent's office may be time consuming and inconvenient, some insurers allow a customer to start an insurance application process using one or more alternate channels, such as through a telephone call center or a web-based online application process. But allowing customers to apply for insurance via these alternate channels has several drawbacks. First, although a customer may submit his information via any of these channels, a customer may need to wait for the results of the medical underwriting before being covered by the policy. In other words, a customer may need to remain uncovered, or unbound, by the contractual obligations of the insurance policy until the results of the medical underwriting process are finished.

Second, because of the complications surrounding the life insurance application process, many customers may not understand the questions presented and/or the overall application process unless explained by an insurance agent. Because visiting an agent's office may be inconvenient, this may act as a disincentive for customers to purchase life insurance policies.

Third, and further due to the complicated nature of the life insurance application process, insurers typically only offer a subset of their life insurance policy suites available for purchase through an online application process. For example, many insurers only allow a customer to purchase term life insurance policies, policies directed only to children, and/or provide benefit ceilings less than $100,000. The present embodiments may overcome these deficiencies and/or other challenges.

BRIEF SUMMARY

The present embodiments may relate to providing binding receipts for insurance products, such as during an online interaction with a potential customer. If the potential customer answers a series of "knockout" questions satisfactorily from an insurance provider's perspective, temporary coverage or a "binding receipt" for an insurance product may be provided via the internet or other communication network or channel. The binding receipt may provide immediate temporary insurance coverage for the customer up to a limit until the point when a policy is subsequently/ultimately issued or unissued by the insurance provider. On the other hand, if a knockout question is answered unsatisfactorily from the insurance provider's perspective, a binding receipt may not be provided and further investigation and/or interview of the potential customer may be required before an insurance product is eventually sold. Although the preferred insurance product is a life insurance product, the present streamlined techniques for providing binding receipts associated with an insurance product may be used with other insurance products, such as auto, home, renters, etc.

In one aspect, a computer-implemented method for collecting information for issuance of a life insurance policy and/or binding life insurance online may be provided. The method may include: (1) receiving, by one or more processors, information entered via a web-based application; (2) automatically selecting, by one or more processors, a life insurance policy for the customer based upon the information; and/or (3) determining, by one or more processors, whether the life insurance policy requires a medical underwriting procedure. Determining whether a medical underwriting procedure is required is often determined by the age of the customer, the amount of coverage being applied for, and they type of product. Ultimately, the decision to issue a binding receipt may be dependent on the factors and may also involve presenting one or more online "knockout" questions to the customer, and if the customer responds to each question in a negative or satisfactorily manner (such as in a manner indicating a lack of a health condition or health concern), medical underwriting may not be required and/or a temporary binding receipt may be issued or available to the customer. The method may further include (4) generating, by one or more processors, a notification of insurance coverage and corresponding instructions based upon whether the life insurance policy requires a medical underwriting procedure such that providing life insurance to customer is facilitated. The method may include determining, by one or more processors, if the customer is entitled to temporary or permanent life insurance coverage prior to completion of the medical underwriting procedure if required by the life insurance policy, and if so, automatically binding the life insurance policy via the web-based application. The act of generating the notification of insurance coverage and corresponding instructions may include notifying the customer of the temporary or permanent life insurance coverage via the web-based application. The method may include additional, fewer, or alternate actions, including those discussed elsewhere herein.

In another aspect, a computer-implemented method for collecting information for issuance of a life insurance policy and/or binding a life insurance policy online may be provided. The method may include: (1) generating, by one or more processors, a first plurality of fields via a web-based application; (2) selecting, by one or more processors, a life insurance policy for the customer that may require the customer to undergo a medical underwriting procedure based upon information entered via the first plurality of fields; (3) generating, by one or more processors, a second plurality of fields via the web-based application based upon the selected life insurance policy; and/or (4) determining, by one or more processors, whether the customer is entitled to temporary or permanent life insurance coverage prior to completion of the medical underwriting procedure based upon information entered via the second plurality of fields, and if so, legally binding the life insurance policy online during a customer interaction session to facilitate an enhanced customer experience with respect to purchasing life insurance. The method may include additional, fewer, or alternate actions, including those discussed elsewhere herein.

In another aspect, a computer-implemented method for binding a life insurance policy online may be provided. The method may provide a customizable and/or user-specific life insurance online quote for a customer-selected life insurance product based upon the customer information entered (such as entered by the customer via a web-based application or website). The method may include providing user-specific and/or user-customizable life insurance quotes, and/or gathering, via a processor or web-based application, (1) personal information about a customer; (2) policy information and/or desired life insurance product information; (3) health and lifestyle information about the customer, and/or other customer and customer-related information. Gathering the health and lifestyle information about the customer may involve presenting one or more online "knockout" questions to the customer, and if the customer responds to each question satisfactorily, a temporary binding receipt for the life insurance product may be issued or otherwise available to the customer. The life insurance online quote for the customer-selected life insurance product may be available for immediate purchase by the customer online, such as via the web-based application. The method may include providing a current underwriting status of the life insurance policy online; permit purchase of permanent or term life insurance products online; permit online purchase of (and/or payment for) the life insurance product online; and/or permit immediate online binding of the life insurance product. The web-based application may facilitate providing the online functionality (e.g., presenting underwriting status; allowing for online payment and binding; online selection of insurance products, etc.) The method may include additional, fewer, or alternate actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

There are shown in the drawings arrangements which are presently discussed, it being understood, however, that the present embodiments are not limited to the precise arrangements and instrumentalities shown, wherein:

FIG. 3B illustrates an example screenshot 320 for a web-based application used for collecting information from a customer in accordance with an exemplary aspect of the present disclosure;

FIG. 3D illustrates an example screenshot 360 for a web-based application used for collecting information from a customer in accordance with an exemplary aspect of the present disclosure;

FIG. 3F illustrates an example screenshot 380 for a web-based application used for collecting information from a customer in accordance with an exemplary aspect of the present disclosure;

Figure 1:
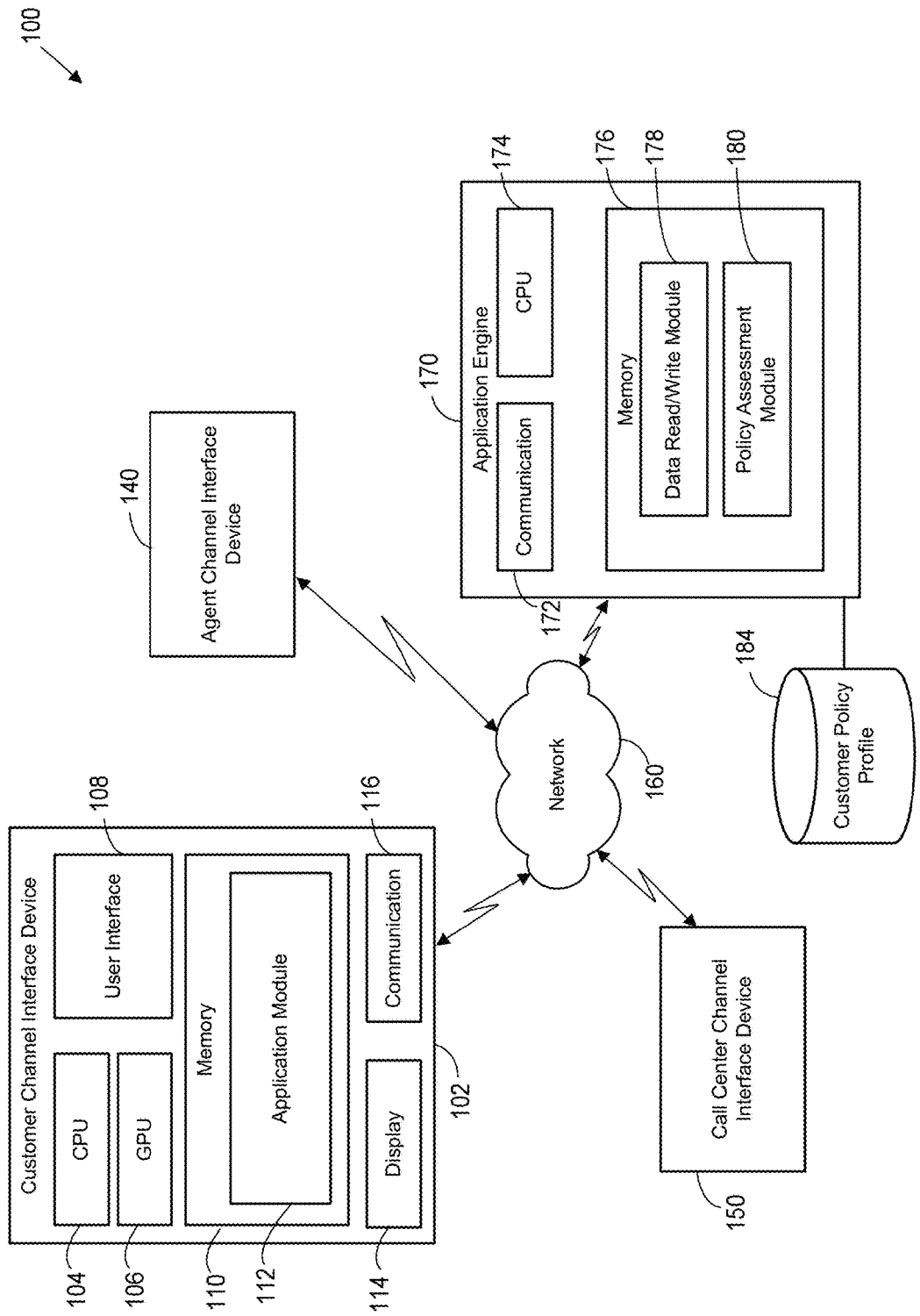
FIG. 1 is a block diagram of an example cross channel network 100 for collecting insurance information from a customer in accordance with an exemplary aspect of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, providing immediate life insurance coverage for an adult via an online transaction. The method may include providing user-specific and/or user-customizable life insurance quotes by gathering, from a user via a user interface: (a) personal information; (b) policy information; and/or (c) health and life style information. A customizable life insurance quote may be provided or displayed for a life insurance product that is available for immediate purchase online. The life insurance product may be permanent or term life information. The user interface or display may provide information to the user related to underwriting status, and include functionality that allows for online payment and immediate binding coverage.

In one aspect, a computer-implemented method may determine whether a binding receipt for a life insurance product is available for a customer, such as during an online interaction with a potential customer. A series of "knockout" questions may be presented to a customer on a display screen. For example, for a life insurance product, the knockout questions may relate to sexually transmitted diseases, smoking habits, criminal record, dangerous activities (e.g., sky diving, scuba diving, downhill skiing), age, medical conditions, etc. If each knockout question is answered satisfactorily, such as the customer indicates that they have no sexually transmitted diseases, do not smoke, have not committed any felonies, do not engage is dangerous activities, and are in general good physical health, a "binding receipt" for an insurance product may be provided via the internet or other communication network or channel. The binding receipt may provide immediate temporary insurance coverage for the customer up to a limit for the applied for insurance product that is to be subsequently issued by the insurance provider. Once the applied for insurance product issues, the binding receipt may be terminated. On the other hand, if a knockout question is answered unsatisfactorily from the insurance provider's perspective (or in the affirmative), a binding receipt may not be provided and further investigation and/or interview of the potential customer may be required before an insurance product is eventually sold.

In another aspect, a computer-implemented method of providing immediate life insurance coverage for an adult may be provided. The method may include remotely gathering and/or presenting knockout questions related to: (a) personal information; (b) user-selected policy (or type of policy) information; (c) medical information; (d) life style information; (e) criminal record information; (f) tobacco or other drug use information; (g) information about other policies owned by the user; (h) beneficiary information; (i) other health information; and/or (j) other types of information from a user, such as via wireless communication and/or a mobile device, such as a smart phone, cell phone, tablet, phablet, laptop, notebook, PDA (personal digital assistant), pager, smart watch, hand-held computing device, computer, access point, node, relay, and/or other device capable of wireless RF (radio frequency) communication. The status of the process or workflow of the user entering various types of information to complete the insurance application may be visually or graphically represented by a status bar. The status bar may be made up of several icons that may change color to indicate if a step has been completed by the user.

A quote for a life insurance product may be remotely generated from the user entered information and remotely or wirelessly transmitted to the user for display on their mobile device. The quote may be user-specific, i.e., based upon the user provided information. The quote may also be customizable by the user. For instance, the user may select the amount of coverage; the type of product, such as term or permanent; and/or length of term (e.g., 10, 20, or 30 years). The quote and/or associated online insurance application may present the user with an online binding offer for life insurance. In other words, after a user is satisfied with the customized coverage that they have selected, if they desire to purchase the life insurance product at the quoted price, once the user electronically pays for the life insurance (such as via a website and/or credit card or financial account information), the user may be immediately covered for the amount of coverage purchased.

During the online application process, the user may be presented with a current underwriting status for his or her application. In the preferred embodiment, temporary coverage under the binder or binding receipt may not mean that the insurance application is provisionally or temporarily approved. For instance, the binder may be a completely separate agreement that may end or terminate with specific actions with regards to the application. However, in other embodiments, the online applications may be immediately provisionally, or at least temporarily, approved.

In a few cases, the amount of coverage purchased may only be temporary if issues arise during the final underwriting checks (and/or other verification) of user entered information. However, it is anticipated that in most cases, that no issues will arise during the final underwriting processing, and that the amount of coverage purchased online will remain in place long-term or permanently. Additionally or alternatively, the amount of coverage purchased online may always be temporary and expire once a permanent insurance policy is issued. In other words, an amount of temporary life insurance coverage purchased online may eventually be converted into a permanent life insurance policy having the same, or even different, coverage amount.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

I. Information Collection Processes

Traditionally, a customer may be able to apply and obtain some types of insurance online. However, for a life insurance policy, which may require medical underwriting, the customer typically must wait until the results of the underwriting are completed to be insured. Receiving the results of the underwriting process may take several weeks, and during this time the customer may be left completely uninsured, as the life insurance policy benefits, premiums, and other contractual details often depend upon the medical underwriting results.

To address these concerns, various aspects of the present embodiments may allow a customer to request a life insurance policy that requires medical underwriting, and may provide the customer with temporary binding life insurance coverage for a temporary period of time, such as 60 days, for example. Although, in some embodiments, this insurance coverage may not be the same as the coverage of the policy for which the customer originally applied, it may provide the customer with some insurance coverage while the underwriting is being completed as long as the customer qualifies for it. As will be appreciated by those of ordinary skill in the relevant art(s), once the underwriting has been completed, a better picture of the risks associated with insuring the customer's life may be determined. As a result of these new found risks, the details associated with the originally applied insurance policy may be adjusted accordingly. For example, if the underwriting process reveals high risks of heart disease, the premiums associated with the life insurance policy may be adjusted to reflect this risk.

To determine whether the customer qualifies for temporary coverage, various aspects include one or more rules or conditions being satisfied that are based upon unacceptable risks even for short-term coverage. Some of these rules, may be, for example, any suitable number of "kick out" rules, which automatically disqualify a customer from the temporary coverage benefit if a customer answers "yes" to any of them. Examples of kick out rules may include, for example, the customer having tested positive for human immunodeficiency virus (HIV), the customer being presently incarcerated, and/or the customer having had a myocardial infarction within three years of the date of application of the life insurance policy.

FIG. 1 is a block diagram of an example cross channel network 100 for collecting insurance information from a customer in accordance with an exemplary aspect of the present disclosure. Cross channel network 100 may include a customer channel interface device 102, a call center channel interface device 150, an agent channel interface device 140, and an application engine 170. In the present aspect, a customer may enter any suitable information that is used for the selection and determination of a particular insurance policy via any of customer channel interface device 102, call center channel interface device 150, and/or agent channel interface device 140.

As further explained below, various aspects of cross channel network 100 may enable a customer to utilize an application, such as a web-based application, for example, to submit information and/or requests for one or more insurance policies. Furthermore, various aspects of cross channel network 100 may enable a customer to receive information regarding whether (i) the customer qualifies for the requested policy; (ii) whether medical underwriting is required, and/or (iii) whether the customer qualifies for temporary insurance coverage. The cross channel network 110 may allow a customer to submit payment, and then process such payments, and/or allow a customer to view information, such as the status of the medical underwriting process, notifications and/or other relevant information and/or instructions throughout the application process, etc.

In applying for an insurance policy and submitting the appropriate information via one or more of customer channel interface device 102, call center channel interface device 150, and/or agent channel interface device 140, a customer may start and complete the application process from one interface, or may stop and wish to start the process up again using another interface. For example, the customer may use customer channel interface device 102 at home as a personal computer, but may wish to consult his agent at some point in the application process. Traditionally, a customer's progress in one channel might be saved, but lost when a customer wanted to switch to a different channel. For example, if a customer starting filling out an online form with customer information for one or more insurance policies, a customer might be able to save that information and pick up where he left off in a later online session, i.e., using the same channel. However, a customer that ended his online session at home and decided to go to an agents' office or call a call center to complete the process may have to start the entire application process over and losing all progress.

To resolve this, the present aspects provide a common application interface for each of customer channel interface device 102, call center channel interface device 150, and/or agent channel interface device 140. An example of such an aspect is described in the commonly-owned U.S. patent application Ser. No. 62/069,093, er 32060/48526, entitled "Insurance Application Process Providing Bound Online Coverage for Filing Insurance Products, "and filed Oct. 27, 2014, which is hereby incorporated by reference in its entirety.

As further explained in the related application, a customer may initially utilize customer channel interface 102 to enter customer information. The customer may enter all necessary customer information using customer channel interface 102, or the customer may enter a portion of his information before deciding to visit an agent's office to complete the application. In any event, the customer may enter any portion of customer information at any suitable time by submitting any portion of customer information via any of customer channel interface device 102, call center channel interface device 150, and/or agent channel interface device 140, to apply for one or more insurance policies.

Customer channel interface device 102 may be configured to connect to application engine 170 via a network 160. Network 160 may include any appropriate combination of wired and/or wireless communication networks. For example, network 160 may include any combination of a local area network (LAN), a metropolitan area network (MAN), a wide area network (WAN), public switched telephone networks (PSTN), and may facilitate a connection to the Internet. To provide further examples, network 160 may include wired telephone and cable hardware, satellite, cellular phone communication networks, etc.

Customer channel interface device 102 may include a central processing unit (CPU) 104, a graphics processing unit (GPU) 106, a user interface 108, a memory 110, a display 114, and/or a communication unit 116. In the present aspect, customer channel interface device 102 may be implemented as a user equipment (UE), such as a mobile device, a computer, laptop, tablet, desktop, or any other suitable type of computing device.

CPU 104 and/or GPU 106 are configured to communicate with memory 110 to store to and read data from memory 110. In accordance with the present aspects, memory 110 is a computer-readable non-transitory storage device that may include any combination of volatile (e.g., a random access memory (RAM), or a non-volatile memory (e.g., battery-backed RAM, FLASH, etc.)). Memory 110 may be configured to store instructions executable on CPU 104 and/or GPU 106. These instructions may include machine readable instructions that, when executed by CPU 104 and/or GPU 106, cause CPU 104 and/or GPU 106 to perform various acts.

User interface 108 may be configured to allow a user to interact with customer channel interface device 102. For example, user interface 108 may include a user-input device such as an interactive portion of display 114 (e.g., a "soft" keyboard displayed on display 114), an external hardware keyboard configured to communicate with customer channel interface device 102 via a wired or a wireless connection (e.g., a BLUETOOTH keyboard), an external mouse, or any other suitable user-input device.

Communication unit 116 may be configured to enable data communications between customer channel interface device 102 and application engine 170 via network 160. In the present aspect, communication unit 116 may be configured to send data, which may include customer information relevant for determining a type of insurance policy and details associated with the insurance policy, entered by a customer via user interface 108, to application engine 170. For example, communication unit 116 may send a customer's desired insurance policy type, risk factors, and/or any other suitable relevant information used to determine an insurance policy type, premium, term, etc., to application engine 170 via network 160.

In the present aspect, communication unit 116 may be configured to receive data, such as insurance policy details, from common application engine 170. For example, communication unit 116 may receive insurance policy premiums, a confirmation of coverage, disclaimers, etc., from common application engine 170 via network 160.

As will be appreciated by those of ordinary skill in the relevant art(s), communication unit 116 may be implemented with any combination of suitable hardware and/or software to enable these functions. For example, communication unit 116 may be implemented with any number of wired and/or wireless transceivers, network interfaces, physical layers (PHY), etc. In aspects in which customer channel interface device 102 may be a mobile device, communication unit 116 may facilitate communications with one or more networks, which may or may not be part of network 160. For example, communication unit 116 may be configured to communicate with cellular and/or WLAN networks in addition to network 160. Networks separate from network 160 are not shown in FIG. 1 for purposes of brevity.

Application module 112 may be a portion of memory 110 configured to store instructions, that when executed by CPU 104 and/or GPU 106, cause CPU 104 and/or GPU 106 to enable user interface 108 to collect user input and to display feedback to a user in accordance with one or more applications and/or programs. For example, executable instructions stored in application module 112 may enable user interface 108 to display one or more fields and/or prompts to a user and/or to accept user input, which may include a customer entering data into one or more of the displayed data fields as part of a web-based application, for example. In the present aspect, instructions stored in application module 112 may enable a user to enter suitable data to enroll in one or more insurance policies.

In the present aspects, application module 112 may enable user interface 108 to facilitate sending data to another device, such as application engine 170, for example, via communication unit 116. For example, application module 112 may include instructions that enable user interface 108 to collect relevant data from a user and then allow the user to submit the relevant data to application engine 170 by filling in appropriate fields, clicking or pressing an appropriate interactive button, selecting one or more suitable interactive buttons from a web-based application, etc.

In the present aspects, application module 112 may include a full application that may be downloaded and/or installed on customer channel interface device 102. In accordance with such aspects, application module 112 may provide standalone application functionality, and may minimally utilize communications with application engine 170 to collect customer information and/or retrieve insurance policy details from application engine 170.

In the present aspects, application module 112 may be implemented as part of a thin client device, and may rely more heavily (i.e., as compared to full application aspects) on communications with common application engine 170 to collect customer information and/or to retrieve insurance policy details from common application engine 170. As will be appreciated by those of ordinary skill in the relevant art(s), various aspects of application module 112 may be utilized based upon a particular implementation of customer channel interface device 102.

Although FIG. 1 illustrates customer channel interface device 102 communicating with a single application engine 170, the present aspects may include customer channel interface device 102 communicating with any suitable number of other application engines using any suitable number of networks.

In the present aspect, agent channel interface device 140 and call center channel interface device 150 may have substantially similar structure, features, and functionality as customer channel interface device 102. Therefore, only differences between these devices will be further described.

In the present aspects, customer channel interface device 102, agent channel interface device 140, and call center channel interface device 150 may each implement respective application modules that include the same level or a different level of application functionality. For example, customer channel interface device 102 may implement application module 112 as part of a thin client device, while agent channel interface device 140 and call center channel interface device 150 implement respective application modules having standalone functionality.

In the present aspects, application engine 170 may be implemented as any suitable type of server, such as an application server, a database server, a standalone sever, a web-based server, and/or as any suitable type of computing device, such as a computer, a smartphone, a laptop, a cloud-based computing device, etc.

In the present aspects, communication unit 172 may be configured to enable data communications between application engine 170 and one or more of customer channel interface device 102, agent channel interface device 140, and call center channel interface device 150 via network 160. Again, this data may include any suitable relevant customer information, for example, sent from one or more of customer channel interface device 102, agent channel interface device 140, and call center channel interface device 150 via their respective channels for enrollment in one or more insurance policies.

In the present aspect, CPU 174 may be configured to communicate with memory 176 to store to and read data from memory 176. In accordance with the present aspects, memory 176 may be a computer-readable non-transitory storage device that may include any combination of volatile (e.g., a random access memory (RAM), or non-volatile memory (e.g., battery-backed RAM, FLASH, etc.). Memory 176 may be configured to store instructions executable by CPU 174. These instructions may include machine readable instructions that, when executed by CPU 174, cause CPU 174 to perform various acts.

Data read/write module 178 and policy assessment module 180 are portions of memory 176 that may be configured to store instructions executable by CPU 174. In the present aspect, data read/write module 178 may include instructions that, when executed by CPU 174, causes CPU 174 to read data from and/or to write data to customer policy profile database 184. In the present aspect, data read/write module 178 may enable CPU 174 to access customer policy profile database 284 to determine one or more appropriate insurance policies to present to the customer based upon previously entered information. In the present aspect, data read/write module 178 may enable CPU 174 to query data from customer policy profile database 184 and/or to store this data in memory 176. Further in accordance with the present aspect, data read/write module 178 may include instructions that enable CPU 174 to access stored data from memory 176 when executing instructions from policy assessment module 180.

In the present aspect, policy assessment module 180 may include instructions to enable CPU 174 to interact with any of customer channel interface device 102, agent channel interface device 140, and/or call center channel interface device 150, to facilitate a potential customer's inquiry and purchase of any suitable number of insurance policy products.

In the present aspect, policy assessment module 180 may include instructions that, when executed by CPU 174, cause CPU 174 to facilitate various steps throughout an insurance application process. For example, policy assessment module 180 may include instructions that, when executed by CPU 174, enable CPU 174 to calculate those policies a customer is qualified to enroll, whether an insurance policy requires medical underwriting, whether additional information may be needed from the customer to issue an insurance policy, whether a customer qualifies for temporary insurance coverage while the underwriting is being performed, the associated details for one or more qualified and/or enrolled insurance policies, premiums associated with one or more selected policies, benefits associated with one or more selected policies, payment processing, etc.

In the present aspect, these calculations may be based upon, for example, a risk assessment algorithm that utilizes relevant customer information such as lifestyle choices, age, etc., to determine whether the customer is qualified for one or more insurance policies. To provide another example, these calculations may be based upon one or more sets of rules and/or condition, such as the aforementioned kick out rules, for example. As will be appreciated by those of ordinary skill in the relevant art(s), a risk assessment algorithm may be tailored based upon a particular set of data, which may include medical underwriting data when relevant and/or any other suitable type of assessed risk data, marketing data, promotional rates, etc.

In the present aspects, customer policy profile database 184 may be implemented within common application engine 170, separate from common application engine 170, or external to common application engine 170.

In accordance with the present aspects, any of assessment module 112, data read/write module 178 and/or policy assessment module 180 may operate as a separately executable software application, a plugin that extends the functionality of another software application such as a web browser, an application programming interface (API) invokable by a software application, etc. The instructions included within any of policy assessment module 112, data read/write module 178, policy assessment module 180, and/or data collection module 182 may be compiled and executable on their respective CPUs directly, or not compiled and interpreted by their respective CPUs on a runtime basis.

FIG. 1 illustrates application engine 170 coupled directly to customer policy profile database 184 for purposes of brevity. As will be appreciated by those of ordinary skill in the relevant art(s), the present aspects of application engine 170 may include application engine 170 accessing customer policy profile database 184 via any suitable network, which may be substantially similar to network 160, for example. In accordance with such aspects, application engine 170 may be configured to access customer policy profile database 184 via a network such that customer policy profile database 184 and application engine 170 need not be co-located. For example, in accordance with such aspects, common application engine 170 may access customer policy profile database 184 via a connection to the Internet to download relevant customer information. To provide another example, application engine 170 may access customer policy profile database 184 via a local, secure connection to one or more private servers to download relevant premium quoting information.

Although illustrated as a single engine in FIG. 1, in the present aspects, application engine 170 may be implemented with any number or group of application engines. In accordance with such aspects, each application engine may include one or more CPUs and may be configured to operate independently of other application engines. Application engines operating as a group may process requests from any suitable number of customers via various channels individually (e.g., based upon their availability) and/or concurrently (e.g., parallel processing). Application engines operating as a group may process data received from one or more channels in a prioritized and/or distributed manner. For example, an operation associated with processing a request may be performed on one application engine while another operation associated with processing the same request (or a different request) may be performed on another application engine.

II. Exemplary Web-Based Insurance Application Process

Figure 2:
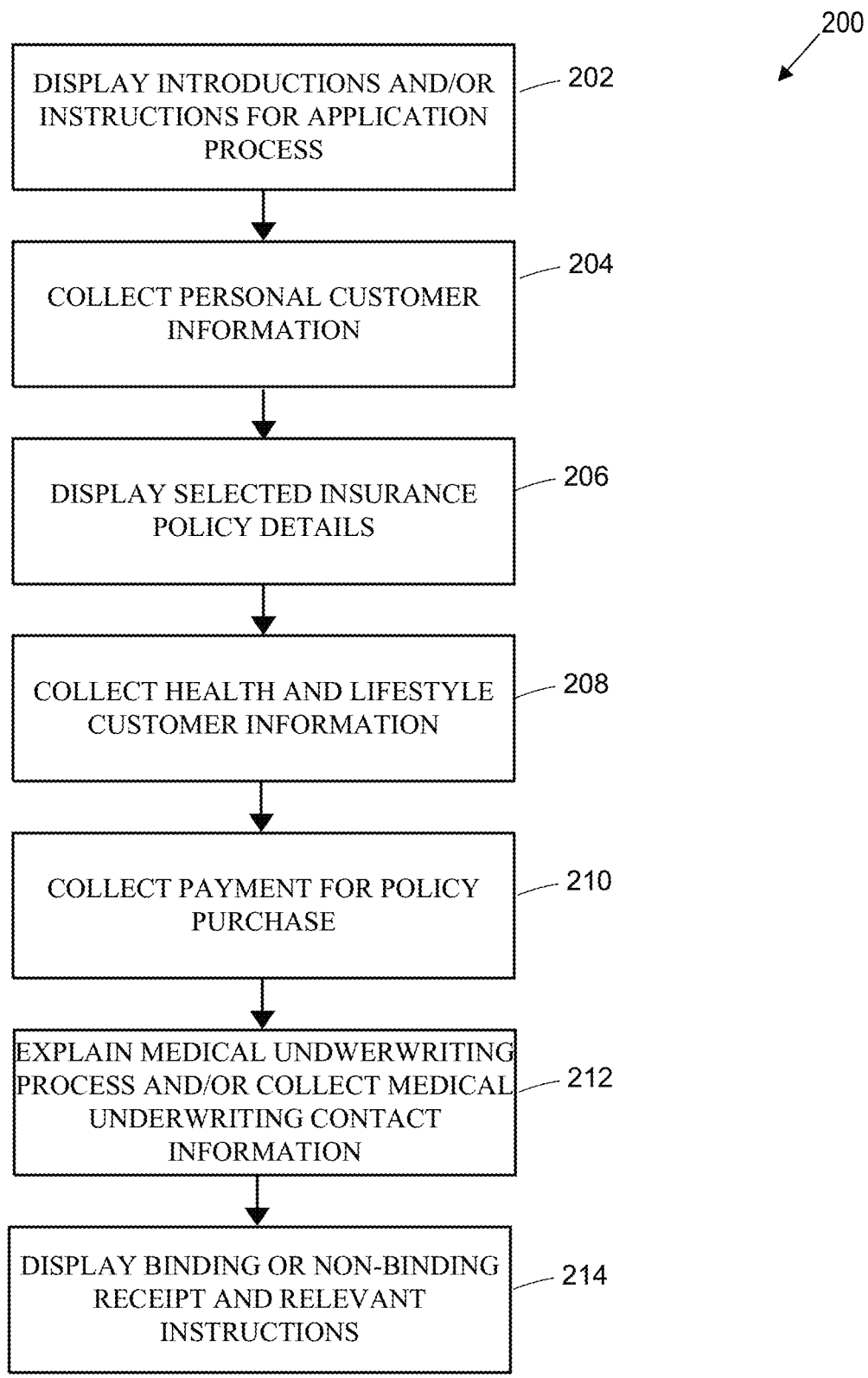
FIG. 2 illustrates a method 200 for collecting customer information for issuance of an insurance policy using a web-based application in accordance with an exemplary aspect of the present disclosure.

FIG. 2 illustrates a method 200 for collecting customer information for issuance of an insurance policy using a web-based application in accordance with an exemplary aspect of the present disclosure. In the present aspects, method 200 may be implemented as a part of any suitable interface device, such as any of customer channel interface device 102, call center channel interface device 150, agent channel interface device 140, and/or by application engine 170, for example, as shown in FIG. 1. Method 200 provides an example aspect of an overall life insurance application process. Additional details are further provided below with reference to various blocks of method 200 as part of respective screenshots shown in FIGS. 3A-G.

Method 200 may begin when one or more processors displays one or more introductions and/or instructions for a customer starting a life insurance application process (block 202). In the present aspect, block 202 may be implemented as part of a web-based application, such as a web-based application running on an interface device, such as customer channel interface device 102, for example, as shown in FIG. 1. In the present aspects, method 200 may include displaying instructions to the customer for using the web-based application, an introduction to the process of applying for life insurance, local agents available for consultation, etc. (block 202). In the present aspect, method 200 may include providing a customer with various insurance products available for purchase and may include the customer's selection of one of these insurance products (block 202). In such a case, method 200 may also include a summary of the selected insurance policy as a customer continues the application process for easy reference (block 202).

Method 200 may include one or more processors collecting personal customer information from the customer (block 204). These one or more processors may include a CPU, such as CPU 174, for example, as shown in FIG. 1, which may receive the customer information in conjunction with a communication unit, such as communication unit 172, for example. In the present aspect, method 200 may include displaying one or more prompts and/or fields as part of a web-based application (block 204). Method 200 may include collecting information from a customer as a customer fills in these prompts and/or fields with applicable information (block 204). In the present aspect, the collection of personal customer information may include, for example, receiving this information via an application engine, such as application engine 170, for example, as shown in FIG. 1 via one or more networks, such as network 160, for example. Examples of personal customer information may include any information relevant for accessing the risk of insuring the customer, such as the customer name, address, marital status, birthdate, one or more beneficiaries, identification (e.g., a driver's license number), etc. In the present aspect, method 200 may include application engine 170 starting a customer policy profile using the collected customer information, which may be stored in one or more memory devices and/or a database, such as customer policy profile database 184, for example, as shown in FIG. 1 (block 204).

Method 200 may include displaying details associated with the customer's selected insurance policy (block 206). In the present aspect, method 200 may include an application engine, such as application engine 170, for example, as shown in FIG. 1, determining an initial premium associated with the selected insurance policy based upon a risk assessment of the customer using the (block 204) previously collected information (block 206). In the present aspect, the initial premium may be used for temporary (or even permanent) binding coverage if the customer later qualifies for it. The initial premium may be an advertised minimum amount provided for reference and/or may be based upon an initial risk assessment algorithm that does not take into account the details of the underwriting process. As a result, the initial premium may provide the customer with temporary coverage and/or provide the customer with coverage based upon a lesser policy benefit than the policy selected by the customer. For example, if a customer applies for a $200,000 life insurance policy, the initial premium may be priced based upon a $50,000 benefit. In such a case, method 200 may include displaying this information to the customer for her reference (block 206).

Method 200 may include collecting health and lifestyle information from a customer (block 208). In the present aspect, method 200 may include collecting a customer's answers to one or more knockout questions and/or prompts regarding information that may be used in conjunction with the underwriting process (block 208). In the present aspect, method 200 may include collecting answers from the customer to one or more knockout or kick out questions, which may be used to determine whether a binding receipt for temporary insurance is available to the customer. For example, if the answers to the knockout questions indicate that the customer lives a risk-averse lifestyle, does not engage in risky or unhealthy activities, and/or does not have any serious medical conditions, then a binding receipt may be available for immediate and temporary insurance coverage. Additionally or alternatively, the answers may be used to assess whether the customer may qualify for temporary (or even permanent) life insurance coverage (block 208).

Method 200 may include collecting payment information from the customer. As will be appreciated by those of ordinary skill in the relevant art(s), the payment may be made in any suitable form (e.g., credit card, bank account draft, etc.) (block 210). The payment may be for any suitable portion of the premium previously displayed to the customer, which may be a temporary premium amount or a final premium amount based upon the collected customer information, life insurance policy type and/or coverage amount, whether medical underwriting is required, and/or relevant customer information previously collected (blocks 204 and/or 208), for example (block 210).

Method 200 may include displaying an explanation of the medical underwriting process to the customer and/or collecting additional information from the customer for medical underwriting purposes (block 212). The explanation may be displayed to the customer and may include information regarding the purpose and need for the medical underwriting procedure, which may also include an explanation of the customer's involvement in the process. The collected information may include, for example, best contact numbers, methods, and times to reach the customer to schedule a medical underwriting procedure.

Method 200 may include displaying a receipt of payment and/or relevant instructions to the customer (block 214). If the customer qualifies for temporary insurance coverage, the present aspects of method 200 may include displaying a binding receipt. In other words, if a customer qualifies for temporary life insurance coverage based upon previously collected information (blocks 204, 206, and/or 208), then method 200 may include displaying a notification of this coverage to the customer (block 214). If the customer does not qualify for temporary life insurance coverage, then method 200 may include displaying a notification to the customer that the customer is either denied coverage completely and/or that the medical underwriting process must first be completed to determine the customer's eligibility and/or associated premiums (block 214). In the present aspect, method 200 may include details regarding the types of tests that may (or will) be performed by a medical professional as part of the medical underwriting process, instructions for the customer to follow when undergoing these procedures, and/or access to the customer's medical underwriting progress, for example (block 214).

III. Exemplary Screenshots of a Web-Based Application

Figure 3A:
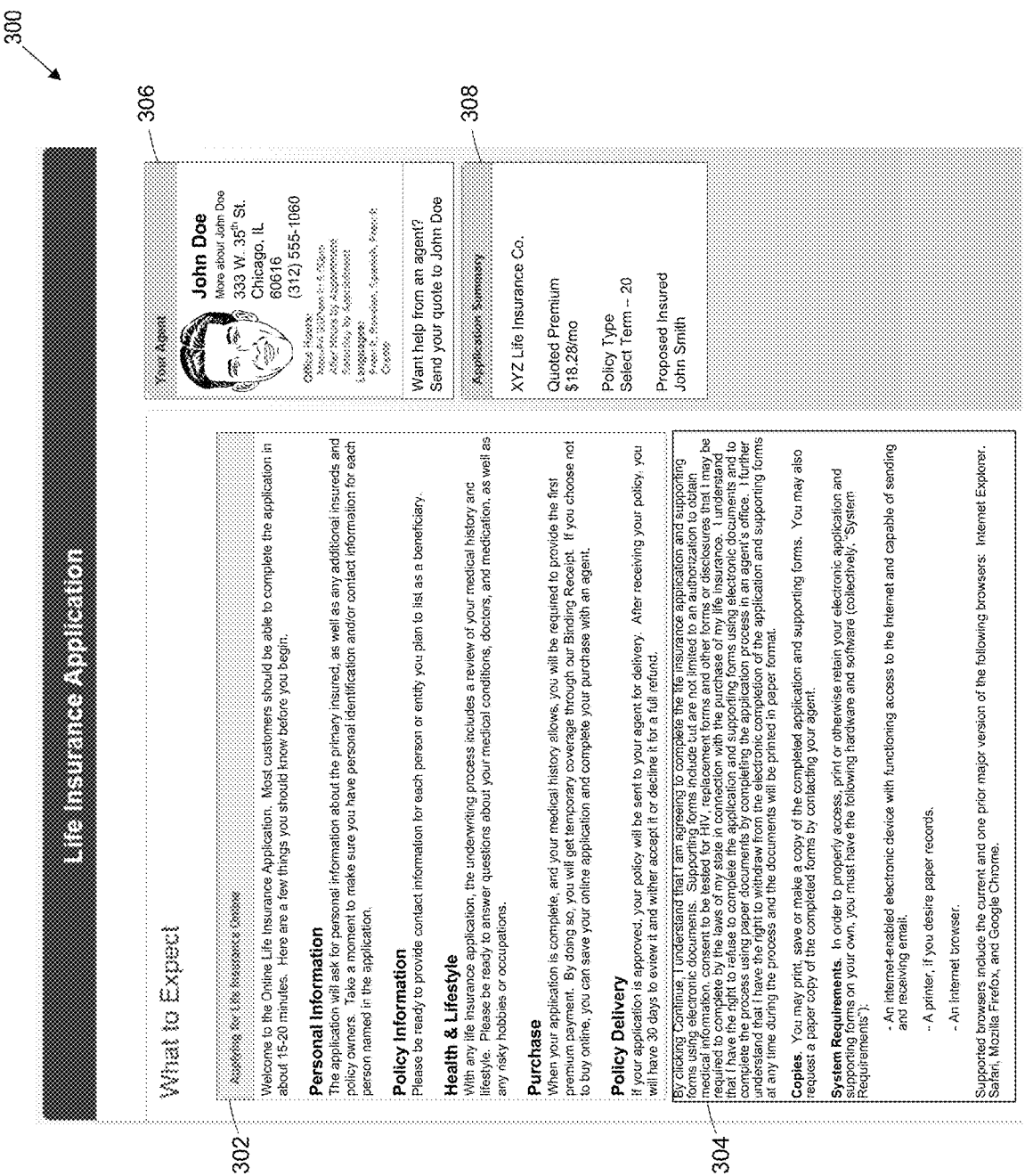
FIG. 3A illustrates an example screenshot 300 for a web-based application used for 100 for collecting information from a customer in accordance with an exemplary aspect of the present disclosure.

In the present aspects, the following screenshots shown in FIGS. 3A-3G are examples of what may be displayed to a customer as part of a web-based application. In the present aspects, the following example screenshots shown in FIGS. 3A-3G may be displayed using any suitable interface device, such as any of customer channel interface device 102, call center channel interface device 150, agent channel interface device 140, and/or by application engine 170, for example, as shown in FIG. 1. In the present aspect, each of the example screenshots shown in FIGS. 3A-3G may correspond to the described functionality previously explained with respect to blocks 202, 204, 206, 208, 210, and 212, respectively, as shown in FIG. 2. For example, the example screenshot 300, as shown in FIG. 3A, may be implemented as part of a web-based application that displays instructions to the customer for using the web-based application and/or an introduction to the process of applying for life insurance, as previously described with reference to block 202. As will be appreciated by those of ordinary skill in the relevant art(s), the exemplary screenshots shown in FIGS. 3A-3G are for illustrative purposes, and their associated functionality may be implemented using any suitable format and/or design for facilitating their corresponding described functionalities without departing from the spirit and scope of the present disclosure.

Furthermore, the present aspects of the web-application may be used by a customer to obtain any number and/or type of life insurance policies, which may include term life insurance policies, permanent life insurance policies, universal life insurance policies, etc. As will be appreciated by those of ordinary skill in the relevant art(s), any suitable number of interactive portions and/or fields may be presented to the customer based upon the particular type of policy the customer is applying for. In addition, the present aspects of the web-application may be used by a customer to obtain life insurance policies for any benefit amount. For example, the present aspects of the web-application may be implemented to allow a customer to apply for life insurance policies with benefit amounts of $100,000 or greater.

FIG. 3A illustrates an example screenshot 300 for a web-based application used for collecting information from a customer in accordance with an exemplary aspect of the present disclosure. Screenshot 300 may include portions 302, 304, 306, and 308. As previously described with reference to block 202, portion 302 includes text explaining an introduction to the life insurance application process and instructions to familiarize the customer regarding what to expect throughout the process, the type of information to have ready, etc.

Portion 304 may include any suitable information regarding legal disclaimers, contractual language regarding electronic signatures and/or language allowing the customer to enter into a contract using the web-based application, miscellaneous technical information, etc. Portion 304 may include any suitable text to achieve this result.

Once the customer has selected a desired insurance policy product, the customer is ready to begin the application process. Portion 308 may indicate a summary regarding the selected policy. This summary may include, for example, details regarding the selected policy type, premium amount, insurer name, etc.

Portion 306 may include local agent information and may be based upon a customer's location. This information may be obtained from a customer logon, a customer identification, etc., that is entered prior to a customer starting the web-based application process. Because the life insurance application process may be inherently complex, providing the customer with agent information allows the customer to easily contact the agent with questions at any time during the application process. As will be further shown throughout the accompanying description of FIGS. 3B-3G below, the present aspects include portions 306 and 308 remaining present at each screenshot for easy reference and confirmation by the customer.

Figure 3B:
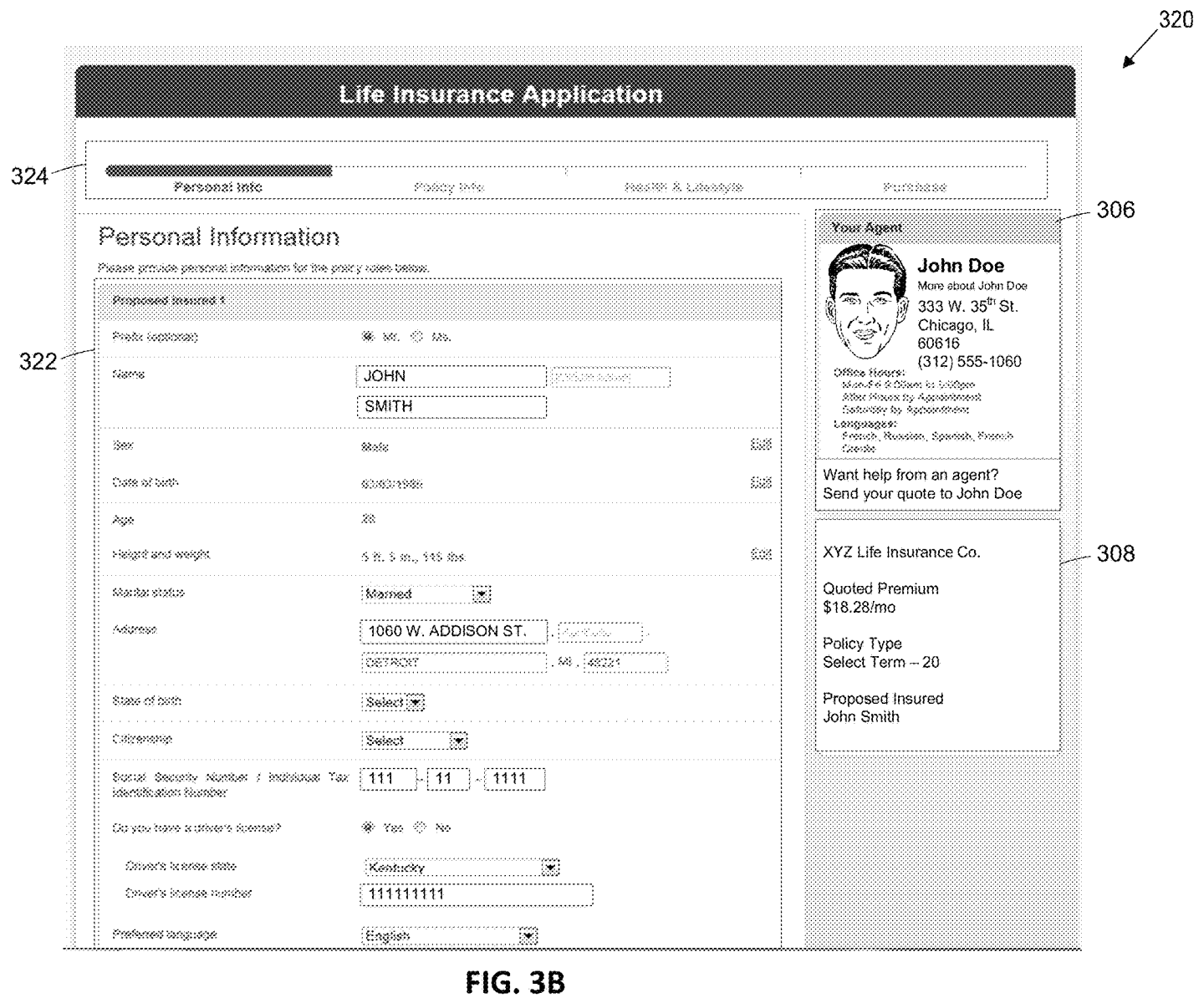

Once the customer is familiarized with the overall life insurance web-based application process, the customer may be ready to start submitting information that will be used to determine the customer's insured risk, eligibility for one or more selected policies, eligibility for temporary life insurance coverage, adjustments to premiums, etc. Although not shown throughout FIGS. 3A-G for purposes of brevity, the customer may begin the application process as shown in FIG. 3B using any suitable interactive methods, such as clicking an appropriate web-based button, etc. In addition, a customer may navigate forwards and backwards through the various steps in the application process using any suitable web-based interactive buttons, tabs, etc.

FIG. 3B illustrates an example screenshot 320 for a web-based application used for collecting information from a customer in accordance with an exemplary aspect of the present disclosure. Screenshot 320 may include portions 306, 308, 322, and 324. Again, portions 306 and 308 may be redisplayed from the previous step in the application process for the customer's convenience.

Portion 322 may include several interactive portions and/or fields that allow a customer to enter corresponding information as indicated by each respective field. As will be appreciated by those of ordinary skill in the relevant art(s), portion 322 may allow a user to scroll and/or may include additional portions to allow a customer to enter additional information as needed that may not be shown in FIG. 3B. For example, additional fields may be generated in response to a user clicking on an interactive button, which is not shown in FIG. 3B for purposes of brevity. To provide another example, additional fields may be accessed by the customer by scrolling down through portion 322. The customer information entered by a user in portion 322 may be, for example, a customer name, gender, birthdate, address, marital status, citizenship, driver's license number, etc.

Portion 324 may include a progress indicator that provides a customer with feedback regarding the customer's overall progress in the application process. As further discussed throughout the accompanying description of FIGS. 3C-3G below, portion 324 may be present at each screenshot to allow a customer to gauge how much more information may be needed until the application is completed, in the present aspect. As shown in FIG. 3B, the progress bar shown in portion 324 may break the application process up into four parts: personal information, policy information, health and lifestyle information, and/or policy purchase. As shown in FIG. 3B, while the customer is entering personal data using the web-based application, the progress bar may indicate the customer's progress accordingly. Once the customer is finished entering personal information, the customer may navigate to the next portion of the web-based application to enter policy information using any suitable method, such as an interactive tab or button, for example.

Figure 3C:
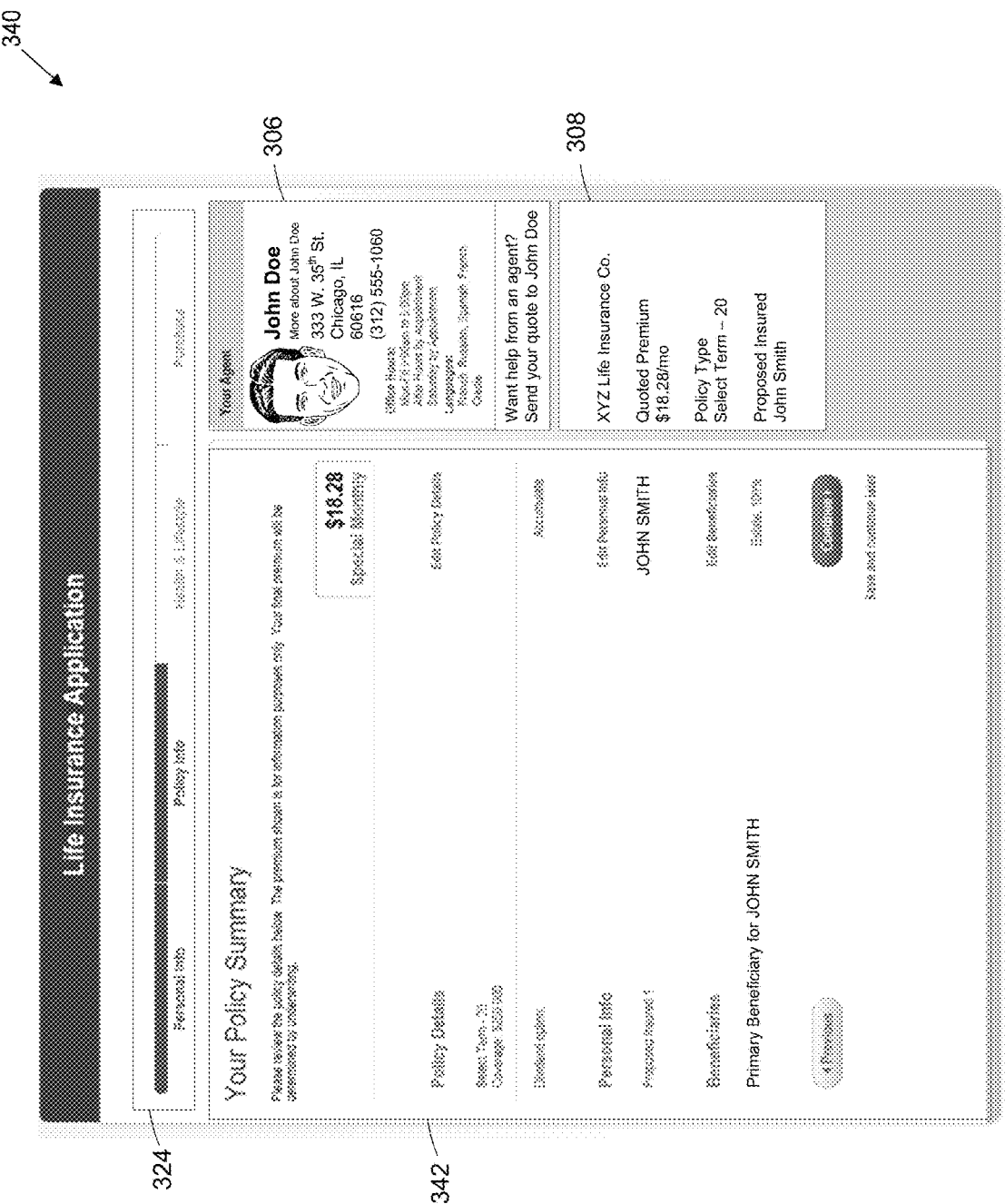
FIG. 3C illustrates an example screenshot 340 for a web-based application used for collecting information from a customer in accordance with an exemplary aspect of the present disclosure.

FIG. 3C illustrates an example screenshot 340 for a web-based application used for collecting information from a customer in accordance with an exemplary aspect of the present disclosure. FIG. 3C may include portions 306, 308, 324, and 342.

As shown in FIG. 3C, the progress bar in portion 324 may indicate the customer's progress throughout the application process. Compared with the progress bar in FIG. 3B, the progress bar illustrated in FIG. 3C may indicate that the customer has completed the personal information step of the application process while currently entering the policy information.

Portion 342 may include several fields that allow a customer to enter information as indicated by each respective field. As will be appreciated by those of ordinary skill in the relevant art(s), additional portions may be displayed allowing a customer to enter additional information as needed. For example, additional portions 342 that include additional fields may be generated in response to a user clicking on an interactive button, such as the "continue button," for example. The fields and interactive portions of portion 324 may allow a customer to select a new policy type, modify a previously selected policy type, enter beneficiary information, etc. Once the customer is finished entering insurance policy information, the customer may navigate to the next portion of the web-based application to enter health and lifestyle information.

Figure 3D:
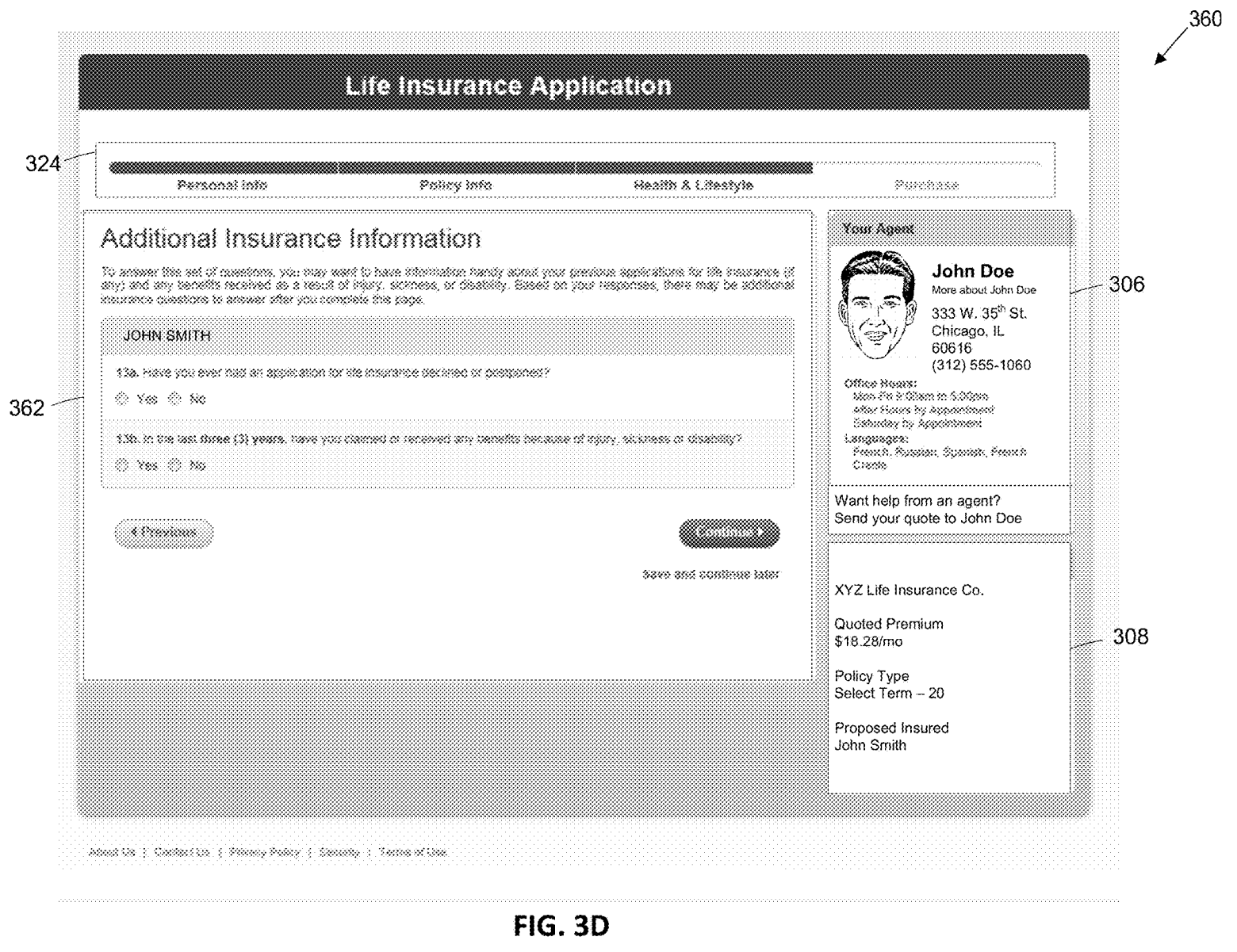

FIG. 3D illustrates an example screenshot 360 for a web-based application for collecting information from a customer in accordance with an exemplary aspect of the present disclosure. FIG. 3D may include portions 306, 308, 324, and 362.

As shown in FIG. 3D, the progress bar in portion 324 once again indicates the customer's progress throughout the application process. Compared with the progress bar in FIG. 3C, the progress bar illustrated in FIG. 3C may indicate that the customer has completed the personal information and insurance policy information steps of the application process while currently entering the health and lifestyle information.

Portion 362 may include several interactive portions and/or fields that allow a customer to enter information as indicated by each respective interactive portion and/or field. As will be appreciated by those of ordinary skill in the relevant art(s), additional portions may be displayed allowing a customer to enter additional information as needed. For example, additional portions 362 that include additional fields may be generated in response to a user clicking on an interactive button, such as the "continue button," for example. The fields and interactive portions of portion 362 may allow a customer, for example, to answer one or more questions that may be utilized for risk assessment and/or to determine a customer's eligibility for temporary (and/or permanent) life insurance coverage.

For purposes of brevity, the fields presented in portion 362 are for illustrative purposes, and are not exhaustive of the types or number of questions that may be presented to a user. As will be appreciated by those of ordinary skill in the relevant art(s), portion 362 may present the customer with any suitable number and types of health and lifestyle questions to adequately assess the risk of issuing the customer a particular life insurance policy.

In the present aspects, the questions presented in portion 362 may ask the customer for a desired type of life insurance policy, a desired type of life insurance coverage, beneficiary information, and one or more knockout questions, such as whether the customer has had a life insurance policy declined in the past, whether the customer has previously received insurance benefits, whether the customer has been diagnosed with the human immunodeficiency virus (HIV) or the Acquired Immune Deficiency Syndrome (AIDS), whether the customer has been diagnosed and/or treated for a disorder of the heart, chest pain, stroke, a kidney disorder, convicted of a felony in the past three years, presently incarcerated, on parole, leaving the country or currently residing outside the country, alcohol and/or tobacco usage and/or frequency, body mass index (BMI), and/or any suitable risk assessment information such as whether the customer participates in inherently dangerous hobbies such as base jumping, rock climbing, vehicle racing, sky diving, etc.

In the present aspect, the number and/or the types of health and lifestyle questions presented to the customer may be reflexive. In other words, the same set of questions may not be presented for each customer, but may be adapted based upon each customer's personal information, a selected policy type, and/or a customer's previous answers to other questions. For example, if a selected insurance policy does not require medical underwriting (e.g., a lower benefit policy is selected, such as $50,000 or less, for example), then the health and lifestyle questions that would otherwise be presented to the customer in conjunction with the medical underwriting process may be omitted. To provide another example, a customer may first be asked if he has been diagnosed with the AIDS virus, and if so, questions regarding whether that client has HIV may be omitted. To provide yet another example, a customer may be notified that she does not qualify for a binder providing temporary insurance coverage, but may be free to continue with a normal underwriting process, such as further interviews with insurance provider representatives and/or medical examinations.

In the present aspect, the customer's answers may be used to determine an appropriate risk class quote. For example, based upon the customer's BMI, the customer may be grouped into one of several risk classes that are appointed by the insurer. These may include classes such as elite, super preferred, preferred, standard, etc. A health customer with an ideal BMI may be classified as a super elite customer, while a customer with a greater BMI with an inactive lifestyle may be classified as standard. Since the premiums quoted may be based upon risk assessments, the present aspects that utilize risk classification from these medical underwriting questions advantageously allow for a quick and accurate initial premium quote to be offered for a customer. Although this premium quote may be adjusted later, taking these risk classifications into consideration initially helps to ensure that the customer's initial quote is closer to the quote that will be calculated after medical underwriting is conducted.

Although the quoted premium shown in portion 308 is pictured as remaining the same throughout each of FIGS. 3A-F, the present aspects may include the displayed premium being adjusted dynamically based upon a customer's answers to one or more questions throughout the application process. For example, the initial premium quote of $18.28/month shown in portion 308 of FIG. 3D may increase (or decrease) if a customer is classified into a higher (or lower) risk class based upon answers to one or more health and lifestyle questions, for example. Once the customer is finished entering health and lifestyle information, the customer may navigate to the next portion of the web-based application to purchase the selected policy.

Figure 3E:
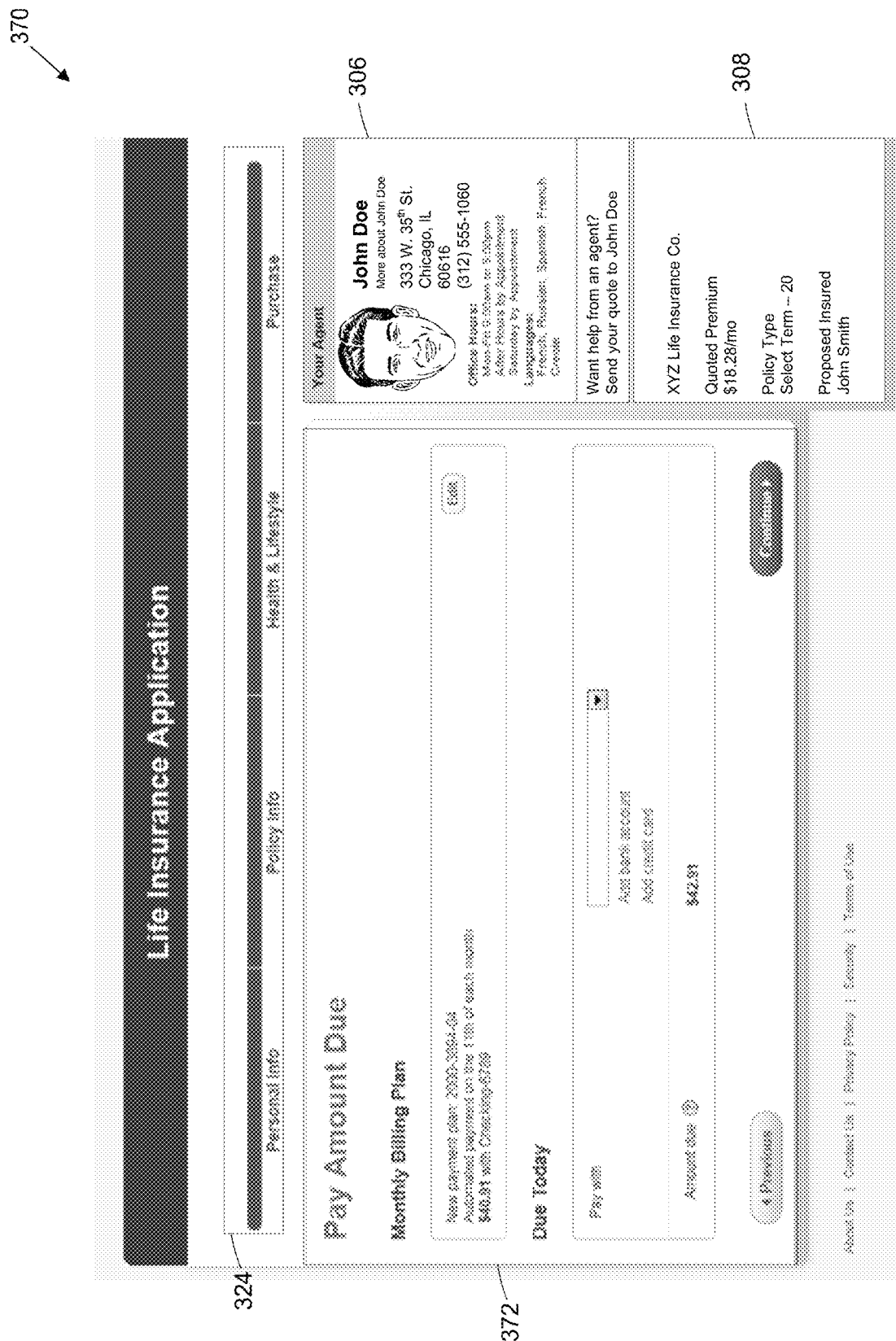
FIG. 3E illustrates an example screenshot 370 for a web-based application used for accepting payment for an insurance policy from a customer in accordance with an exemplary aspect of the present disclosure.

FIG. 3E illustrates an example screenshot 370 for a web-based application used for accepting payment for an insurance policy from a customer in accordance with an exemplary aspect of the present disclosure. Screenshot 370 may include portions 306, 308, 324, and 372.

As shown in FIG. 3E, portion 324 may indicate the customer's appropriate progress during the purchasing step in the application process. Portion 372 may include one or more interactive portions and/or fields that allow a customer to submit a payment for processing one or more portions of the initial quoted premium price. Portion 372 may allow a customer to submit payments in accordance with any suitable type of transaction type and/or process. Once the customer selects the payment process, the customer may continue to review and/or submit additional information that may be used if medical underwriting is deemed necessary. In the present aspect, if a customer answers "yes" to one or more kick out questions presented in the health and lifestyle questions, the customer may be directed to screenshot 380, as shown in FIG. 3F, and payment may not be accepted from the customer until a time at which underwriting has been completed.

In various aspects, screenshot in FIG. 3E may include one or more interactive portions and/or fields that are used to facilitate a customer's acceptance of the terms of the life insurance application upon payment. Although these portions are not shown in FIG. 3E for purposes of brevity, any suitable signature method may be used to facilitate a signature process. For example, screenshot 370 may implement one or more e-signature portions, allow a customer to state his intent to sign by checking one or more checkboxes, select from one or more signature designs, etc.

Figure 3F:
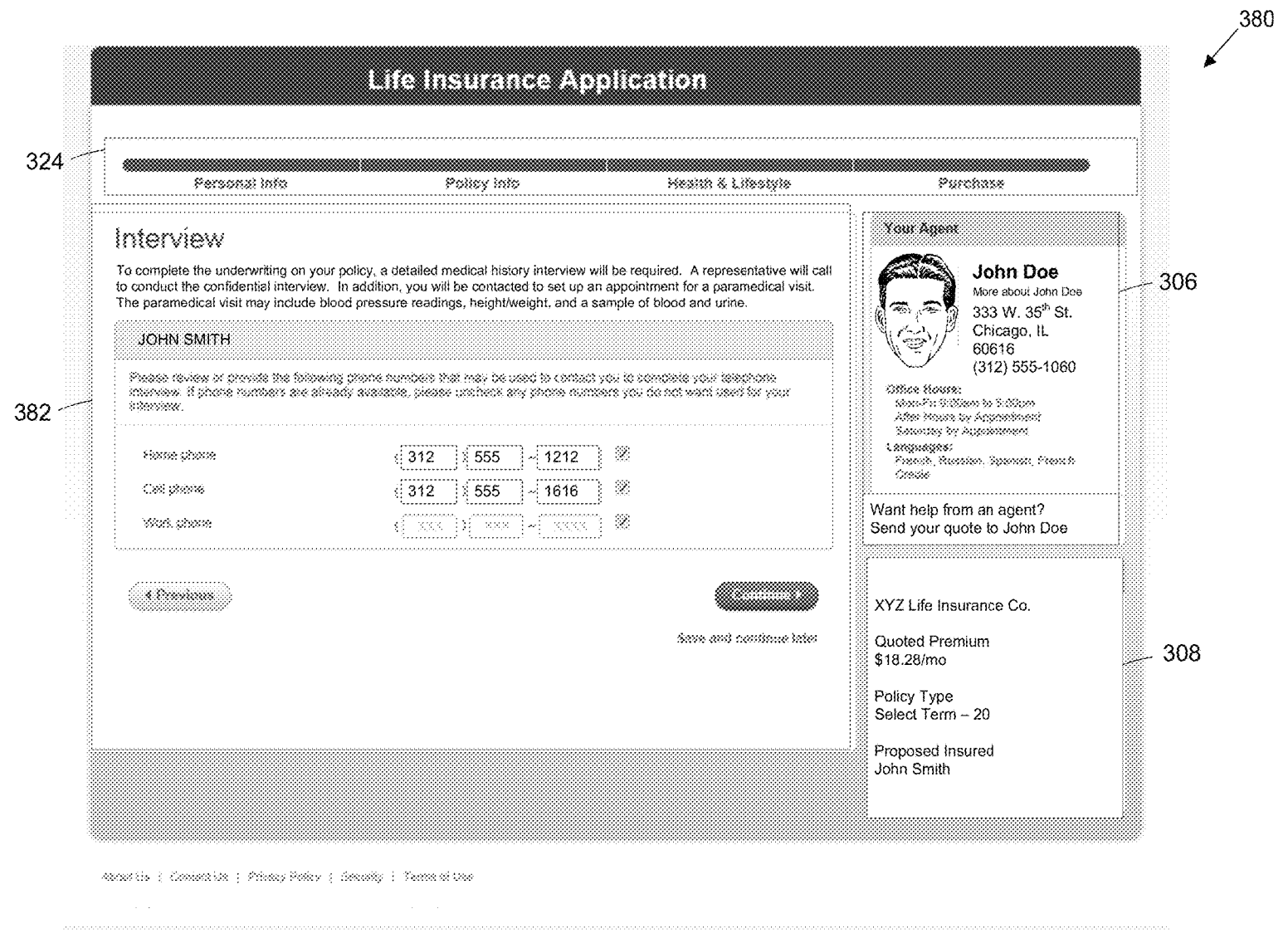

FIG. 3F illustrates an example screenshot 380 for a web-based application used for collecting information from a customer in accordance with an exemplary aspect of the present disclosure. Screenshot 380 may include portions 306, 308, 324, and 382.

Portion 382 may include several interactive portions and/or fields that allow a customer to enter information as indicated by each respective interactive portion and/or field. As will be appreciated by those of ordinary skill in the relevant art(s), additional portions may be displayed allowing a customer to enter additional information as needed. For example, additional portions 382 that include additional fields may be generated in response to a user clicking on an interactive button, such as the "continue button," for example. The fields and interactive portions of portion 382 may allow a customer, for example, to enter contact information and/or preferred contact means, times, etc., that may be used to contact the customer so that medical underwriting testing may be scheduled. Additionally or alternatively, portion 382 may include instructions and/or other information to notify the client of the nature and/or type of medical testing that will be required. Once the customer is finished entering the contact information, the customer may navigate to the next portion of the web-based application to receive a binding or a non-binding receipt.

Figure 3G:
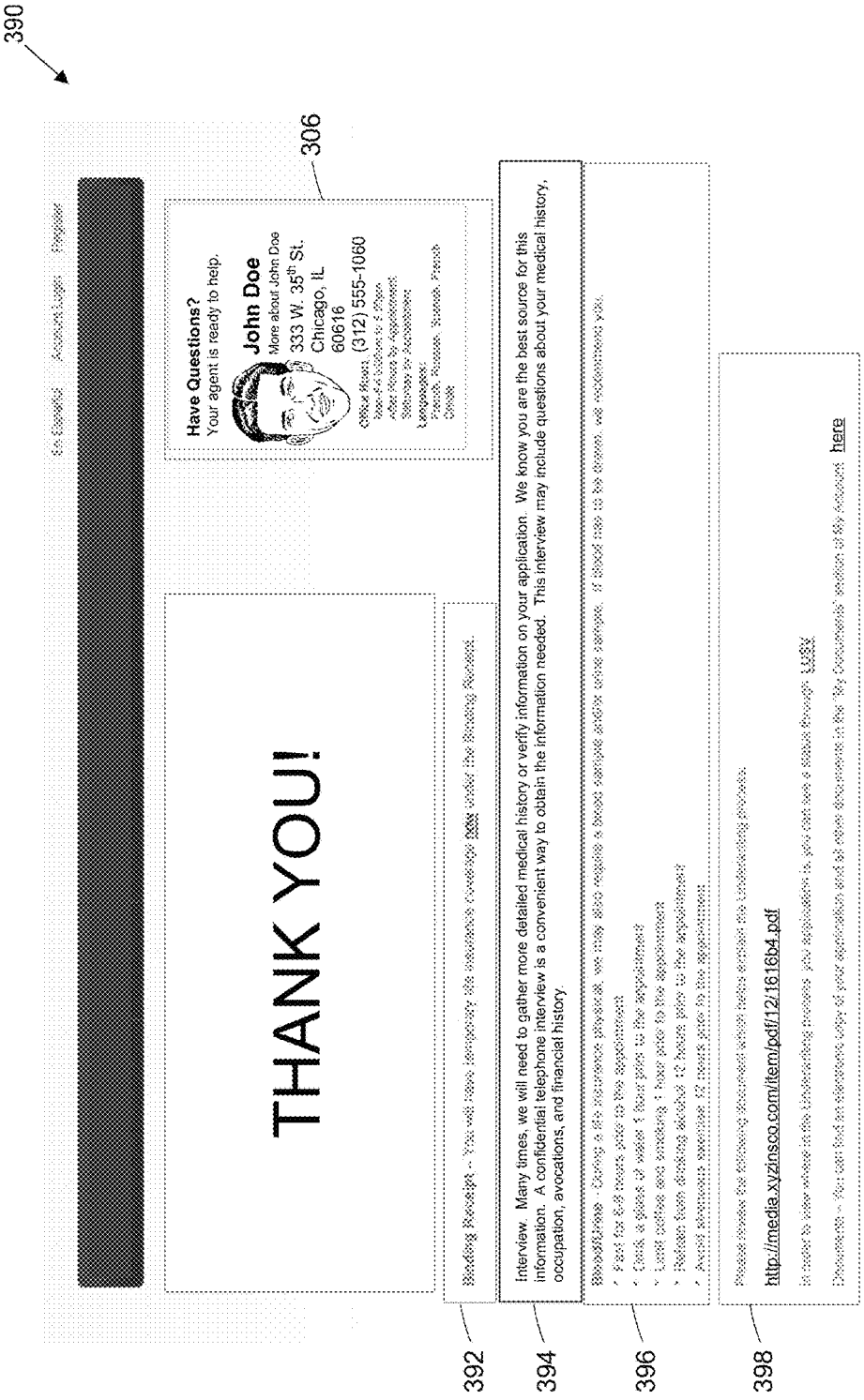
FIG. 3G illustrates an example screenshot 390 for a web-based application used for collecting information from a customer in accordance with an exemplary aspect of the present disclosure.

FIG. 3G illustrates an example screenshot 390 for a web-based application used for collecting information from a customer in accordance with an exemplary aspect of the present disclosure. Screenshot 390 may include portions 306, 392, 394, 396, and 398.

In the present aspect, portion 392 may include instructions informing the customer whether she is insured upon payment of a portion (or all) of the quoted premium. As illustrated in the example screenshot 390 as shown in FIG. 3G, the customer has qualified for temporary life insurance coverage. Although medical underwriting may still need to be performed and the policy premium and/or benefit value may change, the customer may be provided with some life insurance policy protection upon payment, as may be explained in portion 392.

In the present aspects, the customer may or may not qualify for temporary life insurance coverage, but may still be able to purchase a policy once the medical underwriting has been completed. In addition, the present aspects may also result in a customer being denied coverage entirely. In either case, portion 392 may act to notify the customer of this determination.

For example, if a customer has entered "yes" to one or more kick out questions in the health and lifestyle step of the application process, then portion 392 may indicate that the application may be non-binding, that the customer may be ineligible for temporary life insurance coverage, that payment cannot be accepted at this time, etc.

Portion 394 may include information summarizing the medical underwriting process for the customer. As shown in FIG. 3G, this may include information notifying the customer that additional medical information and/or records may be needed, additional non-medical related questions may be needed, etc.

Portion 396 may include information notifying the customer of instructions and/or other details regarding the medical underwriting tests. For example, portion 396 may inform the customer to fast for 6-8 hours before having blood drawn, to drink a glass of water an hour before the scheduled appointment, to refrain from drinking alcohol 12 hours before the scheduled appointment, etc. These instructions help ensure that the customer understands what must be done to help provide more accurate medical underwriting test results.

Portion 398 may include one or more interactive portions and/or instructions that allow the customer to access different portions of customer data. For example, portion 398 may allow a customer to review underwriting process documentation, to view the progress of the medical underwriting process (e.g., by selecting a link to Life Underwriting Status View "LUSV") and/or to access a copy of the application including questions and answers submitted by the customer throughout the application process.

In the present aspect, portion 398 may include any suitable number of links and/or other information for any suitable number and/or types of documents utilized throughout the life insurance application process. Examples of these documents and/or information may include, for example, results of application error checking, reminders, riders, waivers, disclaimers, beneficiary information, etc. For example, portion 398 may provide beneficiary language based upon the previous risk classification of the customer. To provide another example, portion 398 may provide a customer with one or more links to relevant riders based upon the customer's age, type of insurance policy, etc.

To provide yet another example, portion 398 may display one or more waivers of premium disability (WPD). A WPD is a specific rider that is used to provide for premium payment if an insured is unable to pay due to injury or other disability. In an aspect, portion 398 may display one or more reminders to the customer to consider selection this rider due to the benefits it can provide if the customer later cannot pay due to injury or other disability.

Figure 4:
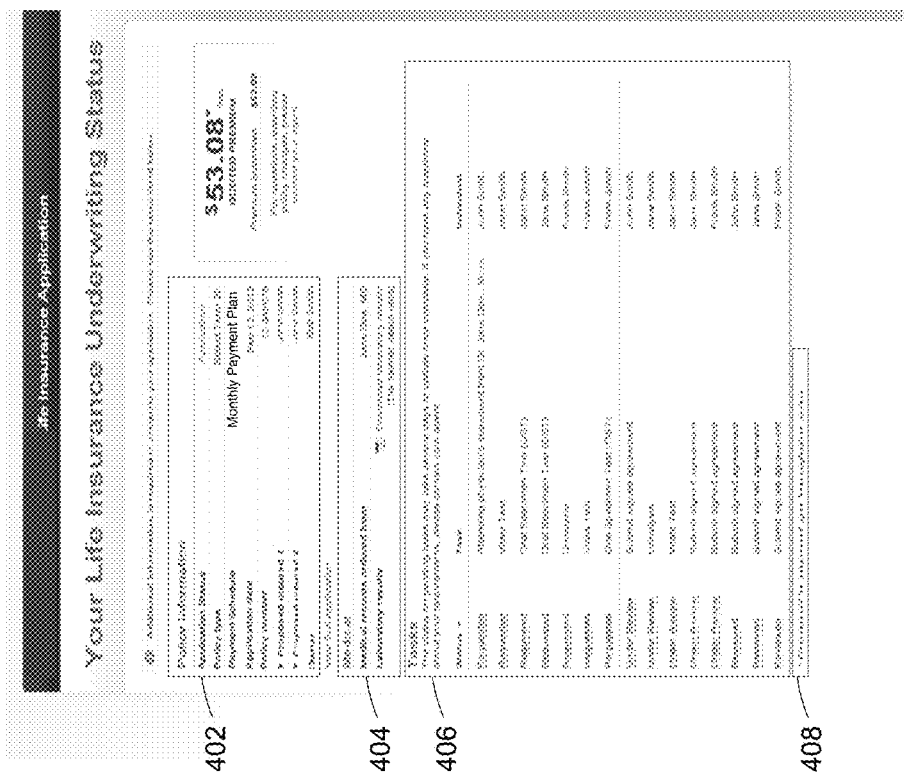
FIG. 4 illustrates an example screenshot 400 for a web-based application in accordance with an exemplary aspect of the present disclosure.

FIG. 4 illustrates an example screenshot 400 for a web-based application in accordance with an exemplary aspect of the present disclosure. Screenshot 400 includes portions 402, 404, 406, and 408. In the present aspect, screenshot 400 is an example of what is displayed to a customer upon a customer's selection of an underwriting status link, as shown in FIG. 3G, for example (e.g., selection of "LUSV" by a customer in portion 398).

Portion 402 may include details associated with the customer's selected insurance policy. This information may include, for example, a policy number, application date, application status, etc.

Portion 404 may include one or more interactive portions and/or other information regarding medical testing that has been performed in accordance with the medical underwriting process. Portion 404 may include, for example, details of medical records that have been ordered and/or results of laboratory tests that have been performed. In this way, a customer may utilize the web-based application to view the status and/or information associated with the medical underwriting process at any time after the application is submitted.

Portion 406 may include one or more interactive portions and/or other information regarding the status of one or more underwriting tasks, which may include medical underwriting tests and/or other information related to the life insurance application process. Portion 406 may include, for example, a listing of applicable medical underwriting test procedures, information regarding a stage for each test within the medical underwriting procedure, a listing of one or more application documents, and/or information regarding a stage for each of the one or more application documents, etc.

Portion 408 may include any suitable information that may be displayed relevant to the medical underwriting status. Portion 408 may include, for example, one or more disclaimers regarding adjustments to premiums upon final review of the medical underwriting tests, etc.

IV. Exemplary Web-Based Application Method

Figure 5:
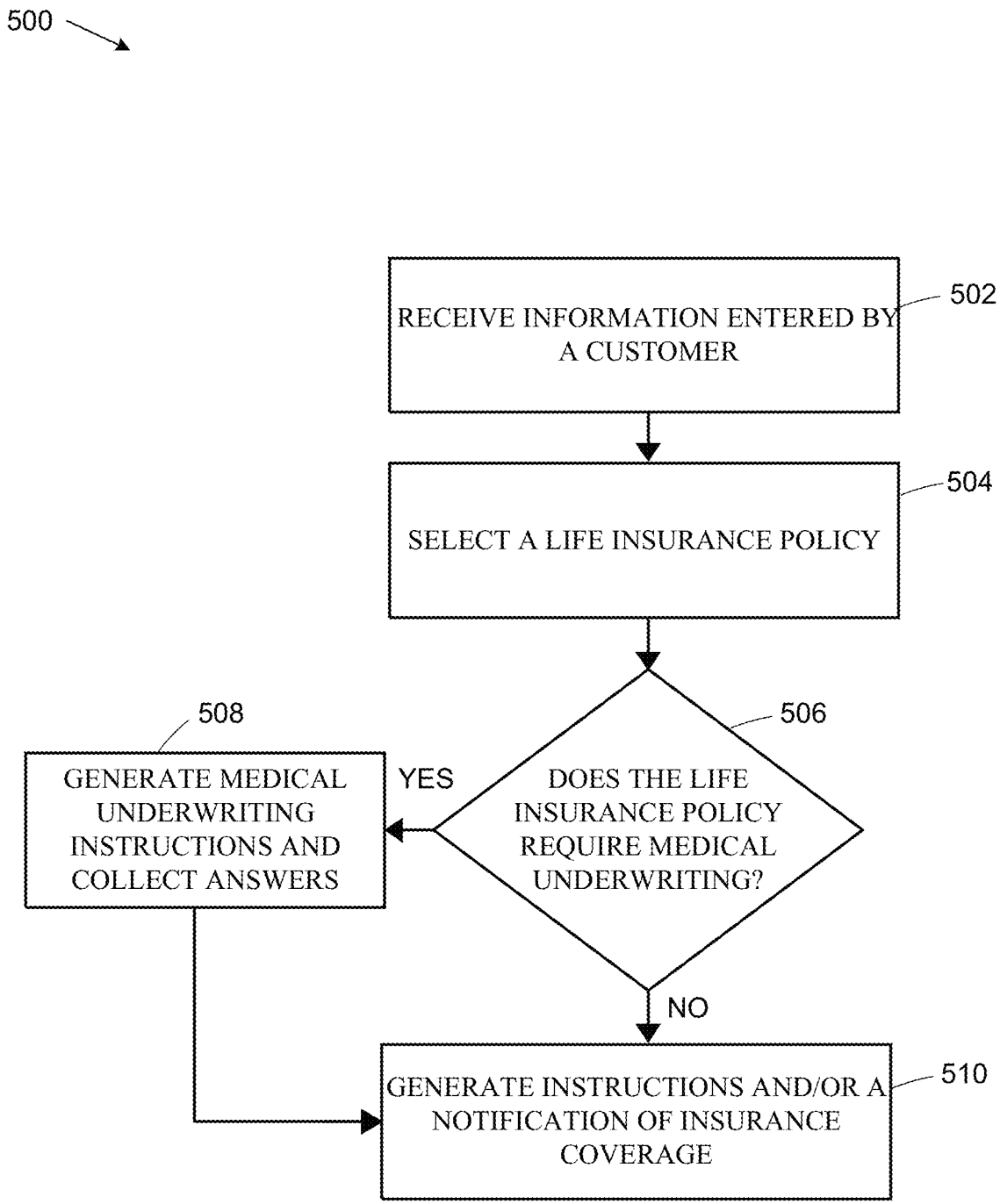
FIG. 5 illustrates a method 500 for collecting information from a customer using a web-based application and issuing of a life insurance policy requiring medical underwriting in accordance with an exemplary aspect of the present disclosure.

FIG. 5 illustrates a method 500 for collecting information from a customer using a web-based application and issuing (and/or automatically binding) of a life insurance policy requiring medical underwriting in accordance with an exemplary aspect of the present disclosure. In the present aspect, method 500 may be implemented as a part any suitable interface device and/or an interaction between any suitable combination of interface devices, such as any of customer channel interface device 102, call center channel interface device 150, agent channel interface device 140, and/or by application engine 170, for example, as shown in FIG. 1.

Method 500 may start when one or more processors may receive information from a customer who desires to purchase one or more life insurance policies (block 502). The one or more processors may include a CPU, such as CPU 174, for example, as shown in FIG. 1, which may receive the customer information in conjunction with a communication unit, such as communication unit 172, for example. In the present aspect, method 500 may include displaying one or more prompts and/or fields as part of a web-based application (block 502). This information may be entered, for example, via one or more interactive portions, fields, and/or prompts as part of a web-based application. In the present aspect, the web-based application may be installed and/or run on any suitable interface device, such as customer channel interface device 102, agent channel interface device 140, and/or call center channel interface device 150, for example, as shown in FIG. 1. In the present aspect, the customer information may be received by one or more application engines via one or more networks, such as network 160 and application engine 170, for example, as shown in FIG. 1. The information may include, for example, personal information and/or a customer's selection of one or more desired life insurance policies.

Method 500 may include selecting a life insurance policy based upon the customer information (block 502) previously received (block 504). This selection may include, for example, matching the customer's desired selection to one or more life insurance policy products. In the present aspect, method 500 may include an application engine, such as application engine 170, as shown in FIG. 1, for example, executing one or more routines, algorithms, and/or programs to determine a matched life insurance policy (block 504). In the present aspect, method 500 may include CPU 174 executing instructions stored in policy assessment module 180 to facilitate this determination (block 504).

Method 500 may include determining whether the selected life insurance policy requires medical underwriting (block 506). In an aspect, method 500 may include an application engine, such as application engine 170, as shown in FIG. 1, for example, executing one or more routines, algorithms, and/or programs to determine the medical underwriting requirements of a selected policy based upon the customer information, policy type, an amount of coverage, etc. (block 506). In an aspect, method 500 may include CPU 174 executing instructions stored in policy assessment module 180 to facilitate this determination (block 506). If the life insurance policy requires medical underwriting, then method 500 continues (block 508). Otherwise, method 500 continues (block 510).

Method 500 may include generating medical underwriting questions and collecting a customer's answers in response to these questions (block 508). In an aspect, method 500 may include an appropriate interface device displaying or executing instructions stored in a policy assessment module, such as policy assessment module 180, as shown in FIG. 1, for example, to facilitate this determination (block 508). If the life insurance policy requires medical underwriting, then method 500 may continue (block 508). Otherwise, method 500 may continue (block 510). These questions may include, for example, one or more kick out questions, health, and/or lifestyle questions. For example, these questions may include questions presented to a customer such as those discussed with reference to the example screenshot as shown in FIG. 3D. Once the relevant questions are generated for the customer and the customer's responses are collected, method 500 continues (block 510).

Method 500 may include generating instructions and/or a notification of insurance coverage (block 510) based upon the customer's answers to questions (blocks 502 and/or 508). In the present aspect, method 500 may include generating instructions and/or notifications (block 510) based upon the determination (block 506) regarding whether the selected life insurance policy requires medical underwriting and/or customer responses to generated medical underwriting questions presented (block 508).

For example, in the present aspect, if the selected life insurance policy requires medical underwriting, then method 500 may include displaying instructions to the customer regarding the steps involved in this process, as previously discussed with reference to FIG. 3F and/or FIG. 3G, for example (block 510). To provide another example, in the present aspect, if the customer answered yes to one or more kick out questions, then method 500 may include notifying the customer that the customer is not eligible for temporary insurance coverage (block 510). To provide yet another example, if the determination made (block 506) is that the selected life insurance policy does not require medical underwriting, then method 500 may include notifying the customer that this is not required, and/or that coverage is effective immediately (and/or the life insurance policy is legally bound) upon acceptance of payment (block 510).

V. Another Exemplary Web-Based Application Method

Figure 6:
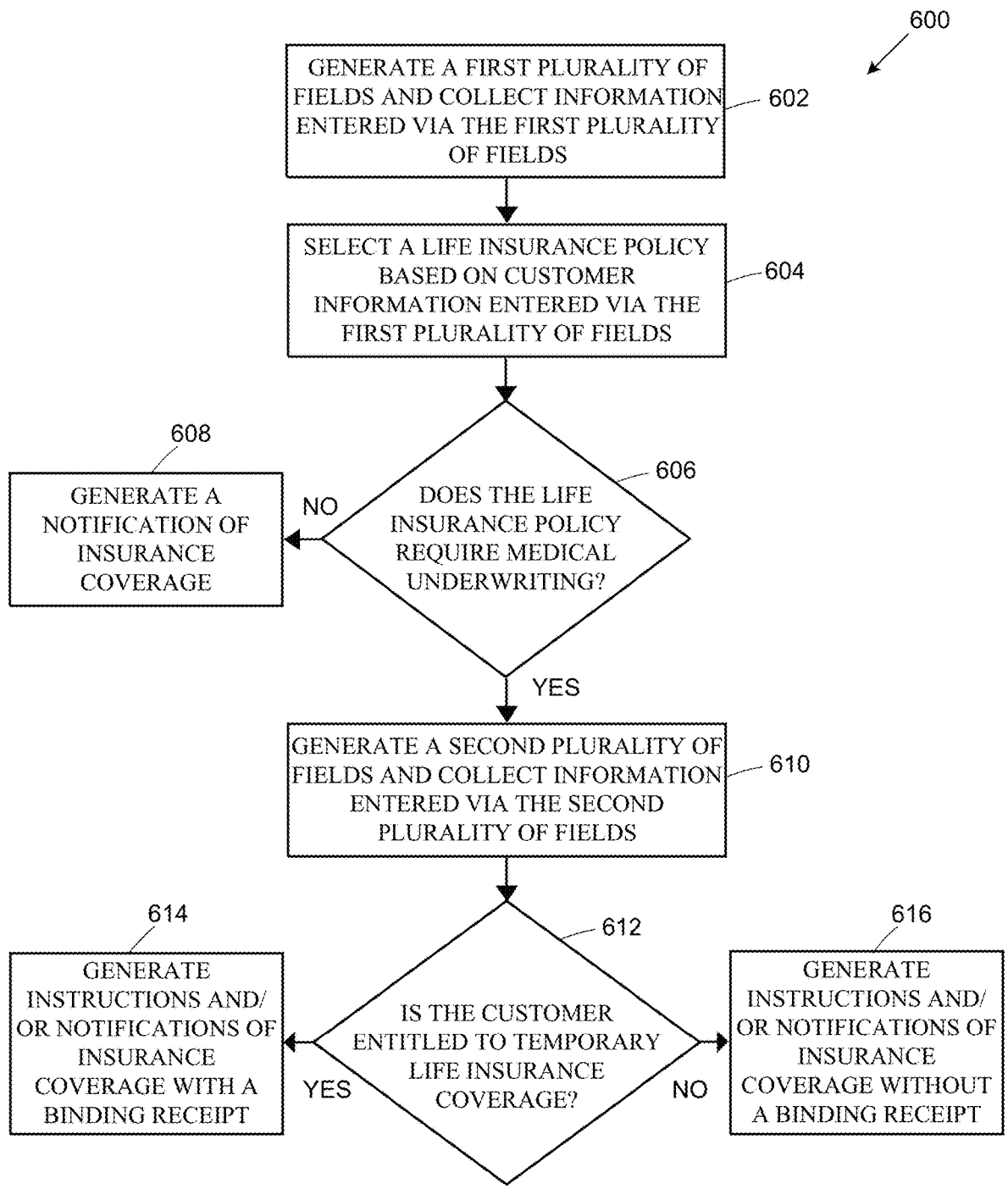
FIG. 6 illustrates a method 600 for collecting information and issuing temporary insurance coverage using a web-based application in accordance with an exemplary aspect of the present disclosure.

FIG. 6 illustrates a method 600 for collecting information and issuing and/or binding temporary (or permanent) insurance coverage using a web-based application in accordance with an exemplary aspect of the present disclosure. In the present aspects, method 600 may be implemented as a part any suitable interface device and/or an interaction between any suitable combination of interface devices, such as any of customer channel interface device 102, call center channel interface device 150, agent channel interface device 140, and/or by application engine 170, for example, as shown in FIG. 1.

Method 600 may start when one or more processors generate a first plurality of fields within a web-based application and collect customer information entered via the first plurality of fields (block 602). In the present aspect, the web-based application may be installed and/or run on any suitable interface device, such as customer channel interface device 102, agent channel interface device 140, and/or call center channel interface device 150, for example, as shown in FIG. 1. These one or more processors may include a CPU and/or a GPU, such as CPU 204 and/or GPU 206, for example, as shown in FIG. 1. In the present aspect, method 600 may include displaying one or more prompts and/or fields as part of a web-based application (block 602). These fields may include, for example, fields corresponding to one or more questions for collecting customer information and may include, for example, personal information and/or a customer's selection of one or more desired life insurance policies.

Method 600 may include selecting a life insurance policy (block 604) based upon the customer information received (block 602). This selection may include, for example, matching the customer's desired selection to one or more life insurance policy products. In the present aspect, method 600 may include an application engine, such as application engine 170, as shown in FIG. 1, for example, executing one or more routines, algorithms, and/or programs to determine a matched life insurance policy (block 604). In the present aspect, method 600 may include CPU 174 executing instructions stored in policy assessment module 180 to facilitate this determination.

Method 600 may include determining whether the selected life insurance policy requires medical underwriting (block 606). In the present aspect, method 600 may include an application engine, such as application engine 170, as shown in FIG. 1, for example, executing one or more routines, algorithms, and/or programs to determine the medical underwriting requirements of a selected policy based upon the customer information, policy type, an amount of coverage, etc. (block 606). In the present aspect, method 600 may include CPU 174 executing instructions stored in policy assessment module 180 to facilitate this determination (block 606). If the life insurance policy requires medical underwriting, then method 600 continues (block 610). Otherwise, method 600 continues (block 608).

Method 600 may include generating a notification of insurance coverage (block 608) if a determination is made (block 606) that the insurance policy does not require medical underwriting. This may include, for example, displaying a notification that medical underwriting is not required for the selected type of policy and/or that coverage is effective immediately upon acceptance of payment.

Method 600 may include generating a second plurality of fields and collecting information entered from the customer via the second plurality of fields (block 610). In various aspects, method 600 may include determining and generating appropriate fields corresponding to questions used in conjunction with a medical underwriting process (block 610). For example, method 600 may include the generation of one or more fields corresponding to one or more kick out questions and/or health and/or lifestyle questions, as previously discussed with reference to FIG. 3D, for example (block 610). In the present aspect, method 600 may include generating the second plurality of fields based upon the customer's responses to earlier presented questions corresponding to a portion of the plurality of second fields that may otherwise be presented (block 610).

As previously discussed with reference to screenshot 360, as shown in FIG. 3D, in the present aspect, method 600 may include determining whether additional answers are needed from the customer, and generate the second plurality of fields having questions that are based upon the customer's previous answers such that the questions presented are reflexive (block 610). In other words, method 600 may generate the second plurality of fields such that they address only questions in which additional answers are needed from the customer for the accurate determination of risk assessment (block 610). Once the relevant questions are generated for the customer and the customer's responses are collected, method 600 continues (block 612).

Method 600 may include determining whether the customer is entitled to temporary life insurance coverage upon payment of a portion of the premium (block 612). In an aspect, this may include a determination being made of whether one or more kick out questions and/or conditions collected from the customer (block 610) were answered affirmatively, as previously discussed with reference to FIG. 3D, for example. If the one or more kick out questions and/or conditions were answered affirmatively, then method 600 continues (block 616). Otherwise, method 600 continues (block 614).

Method 600 may include instructions and/or notifications being generated and displayed to the customer regarding ineligibility for binding insurance coverage (block 614). For example, in an aspect, the instructions and/or notifications may be medical underwriting instructions, notifications that payment may not be accepted, and/or that a policy may not issue until medical underwriting has been completed, etc., as previously discussed with reference to FIG. 3G, for example.

Method 600 may include instructions and/or notifications being generated and displayed to the customer regarding binding insurance coverage upon receipt of a portion of the premium payment (block 616). For example, in the present aspect, the instructions and/or notifications may be medical underwriting instructions and/or a notification of binding coverage, as shown and previously discussed with reference to FIG. 3G, for example.

Figure 7:
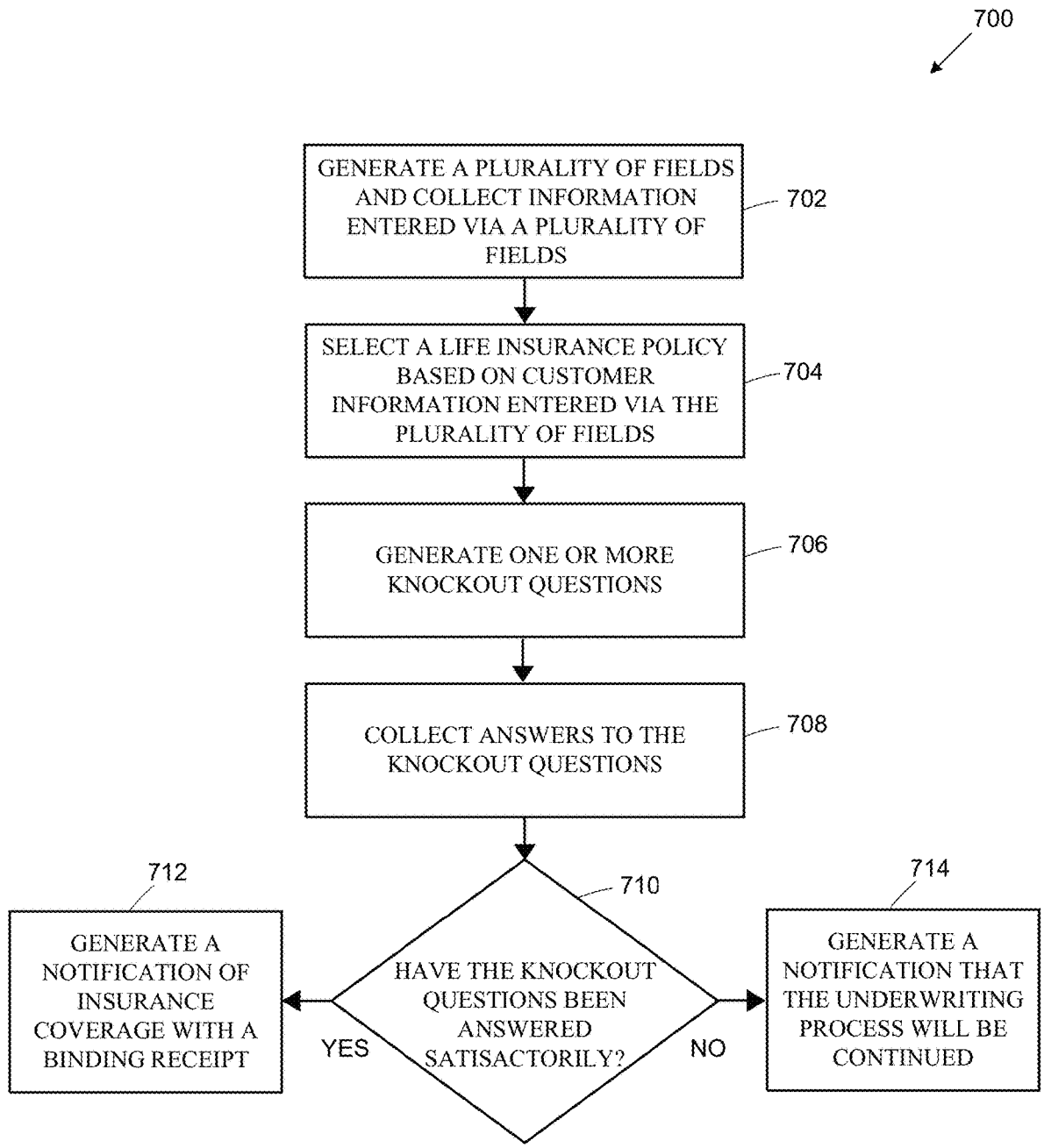
FIG. 7 illustrates a method 700 for determining whether to issue insurance coverage with a binding receipt in accordance with an exemplary aspect of the present disclosure.

FIG. 7 illustrates a method 700 for determining whether to issue insurance coverage with a binding receipt in accordance with an exemplary aspect of the present disclosure. In the present aspects, method 700 may be implemented as a part any suitable interface device and/or an interaction between any suitable combination of interface devices, such as any of customer channel interface device 102, call center channel interface device 150, agent channel interface device 140, and/or by application engine 170, for example, as shown in FIG. 1.

Method 700 may start when one or more processors generate a plurality of fields within a web-based application and collect customer information entered by a customer via the plurality of fields (block 702). In the present aspect, the web-based application may be installed and/or run on any suitable interface device, such as customer channel interface device 102, agent channel interface device 140, and/or call center channel interface device 150, for example, as shown in FIG. 1. These one or more processors may include a CPU and/or a GPU, such as CPU 104 and/or GPU 106, for example, as shown in FIG. 1. In the present aspect, method 700 may include displaying one or more prompts and/or fields as part of a web-based application (block 702). These fields may include, for example, fields corresponding to one or more questions for collecting customer information and may include, for example, personal information and/or a customer's selection of one or more desired life insurance policies.

Method 700 may include selecting a life insurance policy (block 704) based upon the collected customer information (block 702). This selection may include, for example, matching the customer's desired selection to one or more life insurance policy products (block 704). In the present aspect, method 700 may include an application engine, such as application engine 170, as shown in FIG. 1, for example, executing one or more routines, algorithms, and/or programs to determine a matched life insurance policy (block 704). In the present aspect, method 700 may include CPU 174 executing instructions stored in policy assessment module 180 to facilitate this determination.

Method 700 may include generating one or more knockout questions (block 706). In the present aspect, method 700 may include an application engine, such as application engine 170, as shown in FIG. 1, for example, executing one or more routines, algorithms, and/or programs to determine one or more knockout questions (block 706) based upon the selected life insurance policy (block 704). In the present aspect, the knockout questions may be generated via presentation of one or more corresponding prompts and/or fields displayed to a customer based upon underwriting requirements of a selected policy and/or the collected customer information (block 702), policy type (block 704), an amount of coverage, etc. (block 706). Method 700 may include displaying the one or more prompts and/or fields as part of a web-based application (block 706).

In the present aspect, the knockout questions may include, for example, questions related to whether the customer has had a life insurance policy declined in the past, whether the customer has previously received insurance benefits, whether the customer has been diagnosed with the human immunodeficiency virus (HIV) or the Acquired Immune Deficiency Syndrome (AIDS), whether the customer has been diagnosed and/or treated for a disorder of the heart, chest pain, stroke, a kidney disorder, convicted of a felony in the past three years, presently incarcerated, on parole, leaving the country or currently residing outside the country, alcohol and/or tobacco usage and/or frequency, body mass index (BMI), and/or any suitable risk assessment information such as whether the customer participates in inherently dangerous hobbies such as base jumping, rock climbing, vehicle racing, sky diving, etc. (block 706).

Method 700 may include one or more processors collecting a customer's answers to the knockout questions (block 708) that were generated and presented to the customer (block 706). These one or more processors may include a CPU and/or a GPU, such as CPU 104 and/or GPU 106, for example, as shown in FIG. 1. Method 700 may include collecting a customer's answers to the knockout questions as part of a web-based application (block 708).

Method 700 may include one or more processors determining whether answers collected to the generated knockout questions (block 710) were answered affirmatively (or otherwise satisfactorily), as previously discussed with reference to FIG. 3D, for example. In the present aspect, method 700 may include CPU 174 executing instructions stored in policy assessment module 180 to facilitate this determination (block 710). If the knockout questions have been answered satisfactorily, then method 700 continues (block 712). Otherwise, method 700 continues (block 714).

Method 700 may include one or more processors generating a notification of temporary insurance coverage with a binding receipt (block 712) for the selected life insurance policy (block 704). These one or more processors may include a CPU and/or a GPU, such as CPU 104 and/or GPU 106, for example, as shown in FIG. 1. In the present aspect, method 700 may include displaying notification of temporary insurance coverage with a binding receipt as part of a web-based application (block 712). The notification of temporary insurance coverage with a binding receipt may then be printed or otherwise saved by the customer and used as a temporary proof of coverage, if desired. In the present aspect, the binding receipt may provide immediate temporary insurance coverage for the customer up to a limit for selected permanent insurance product that is to be subsequently/ultimately issued by the insurance provider (block 704).

Method 700 may include one or more processors generating a notification that a binding receipt cannot be provided and that the underwriting process is to be continued (block 714). These one or more processors may include a CPU and/or a GPU, such as CPU 104 and/or GPU 106, for example, as shown in FIG. 1. In the present aspect, method 700 may include a notification being displayed that a binding receipt cannot be provided and that the underwriting process is to be continued, which may be facilitated as part of a web-based application (block 714). In the present aspect, the underwriting process may include further investigation, medical screenings, and/or interviewing of the potential customer prior to the selected insurance product (block 704) being sold to the customer. The method 700 may include additional, fewer, or alternate actions, including those discussed elsewhere herein.

VI. Exemplary Method of Binding Life Insurance

In one aspect, a computer-implemented method for collecting information for issuance of a life insurance policy and/or binding a life insurance policy online may be provided. The method may include: (1) receiving, by one or more processors, information entered via a web-based application; (2) automatically selecting, by one or more processors, a life insurance policy for the customer based upon the information; (3) determining, by one or more processors, whether the life insurance policy requires a medical underwriting procedure; and/or (4) generating, by one or more processors, a notification of insurance coverage and corresponding instructions based upon whether the life insurance policy requires a medical underwriting procedure. Determining, by one or more processors, whether the life insurance policy requires a medical underwriting procedure may include consideration of the customer's age, the amount of insurance being applied for, and the type of product; but may also include presenting, by one or more processors, a series of knockout questions on a display; and if the series of knockout questions are answered by a customer in a satisfactorily or negative manner, then the one or more processors may determine that the medical underwriting procedure is not required, and/or that a binding receipt for temporary insurance coverage may be provided to the customer.

Additionally or alternatively, the method may include determining, by one or more processors, if the customer is entitled to temporary or permanent life insurance coverage prior to completion of the medical underwriting procedure if required by the life insurance policy, and if so, automatically bind the life insurance policy via the web-based application. The act of generating the notification of insurance coverage and corresponding instructions may include notifying the customer of the temporary or permanent life insurance coverage via the web-based application. The method may include additional, fewer, or alternate actions, including those discussed elsewhere herein.

For instance, the act of determining if the customer is entitled to temporary life insurance coverage may include denying the customer temporary or permanent coverage if any of a plurality of risk-assessment conditions are true based upon the information. The set of risk assessment conditions may include one or more of: the customer having testing positive for human immunodeficiency virus (HIV); the customer being presently incarcerated; and/or the customer having had a myocardial infarction within three years of the date of application of the life insurance policy.

On the other hand, the act of determining if the customer is entitled to temporary life insurance coverage may include approving the customer temporary or permanent coverage if any of a plurality of risk-assessment conditions are true based upon the information. The set of risk assessment conditions may include one or more of: the customer not having testing positive for human immunodeficiency virus (HIV); the customer not being presently incarcerated; and/or the customer not having had a myocardial infarction within three years of the date of application of the life insurance policy.

The information may include one or more of: a desired type of life insurance policy; desired life insurance coverage; risk assessment information; beneficiary information; and a customer signature. The life insurance policy may include one or more of: a term life insurance policy; a permanent life insurance policy; and a universal life policy. The life insurance policy has a benefit exceeding $100,000 United States (US) dollars.

VII. Other Exemplary Methods of Binding Insurance

In one aspect, a computer-implemented method for collecting information for issuance of a life insurance policy and/or binding a life insurance policy online may be provided. The method may include: (1) generating, by one or more processors, a first plurality of fields via a web-based application; (2) selecting, by one or more processors, a life insurance policy for the customer that may require the customer to undergo a medical underwriting procedure based upon information entered via the first plurality of fields; (3) generating, by one or more processors, a second plurality of fields via the web-based application based upon the selected life insurance policy; and/or (4) determining, by one or more processors, whether the customer is entitled to temporary or permanent life insurance coverage prior to completion of the medical underwriting procedure based upon information entered via the second plurality of fields, and if so, legally binding the life insurance policy online during a customer interaction session to facilitate an enhance customer experience with respect to purchasing life insurance. The method may include additional, fewer, or alternate actions, including those discussed elsewhere herein.

For instance, the method may include displaying a notification to the customer of the temporary or permanent life insurance coverage if the customer is entitled to the temporary life insurance coverage. The method may include receiving a premium payment from the customer for the selected life insurance policy, and wherein the act of displaying the notification comprises: displaying the notification after receiving the premium payment as a binding receipt of insurance coverage.

The information entered via the first plurality of fields may include a body mass index of the customer, and the method may also include determining a risk class based upon the information; and/or associating the selected life insurance policy with a premium based upon the risk class. The information entered via the first plurality of fields may include an age of the customer and a life insurance benefit amount, and the method may also include displaying a rider based upon the information entered via the first plurality of fields.

The act of displaying the rider may include displaying a waiver of premium disability. The method may further include determining a risk class based upon the information entered via the first plurality of fields; and displaying beneficiary information based upon the risk class. The act of generating the second plurality of fields may include determining a customer's response to a first portion of the second plurality of fields; determining whether additional answers are needed from the customer corresponding to a second portion of the second plurality of fields based upon the customer's answers to the first portion of the second plurality of fields; and/or generating the second portion of the second plurality of fields only when it is determined that additional answers are needed.

In another aspect, a computer-implemented method for binding a life insurance policy online may be provided. The method may include providing user-specific and/or user-customizable life insurance quotes, and/or gathering, via a processor or web-based application, (1) personal information about a customer; (2) policy information and/or desired life insurance product information; (3) health and life style information about the customer and/or related answers to a series of knockout or kick out questions, and/or other customer and customer-related information. The method may provide a customizable and/or user-specific life insurance online quote for a customer-selected life insurance product based upon the customer information entered (such as entered by the customer via a web-based application or website). The life insurance online quote for the customer-selected life insurance product may be available for immediate purchase by the customer online, such as via the web-based application. The method may include providing a current underwriting status of the life insurance policy online; permit purchase of permanent or term life insurance products online; permit online purchase of (and/or payment for) the life insurance product online; and/or permit immediate online binding of the life insurance product. The web-based application may facilitate providing the online functionality (e.g., presenting underwriting status; allowing for online payment and binding; online selection of insurance products, etc.) The method may include additional, fewer, or alternate actions, including those discussed elsewhere herein.

VIII. Exemplary Non-Transitory Computer Readable Medium

In one aspect, a non-transitory, tangible computer-readable medium storing machine readable instructions are described that, when executed by a processor, may cause the processor to: (1) receive customer information entered via a web-based application; (2) select a life insurance policy for the customer based upon the information; (3) determine whether the life insurance policy requires a medical underwriting procedure, including age, amount of insurance being applied for, product type and criteria such as based upon customer answers to one or more knockout questions; and (4) generate a notification of insurance coverage and corresponding instructions if the life insurance policy requires a medical underwriting procedure. The machine readable instructions may include additional, less, or alternate functionality, including that discussed elsewhere herein.

The information may include one or more of: a desired type of life insurance policy; a desired life insurance coverage; risk assessment information; beneficiary information; and a customer signature. The life insurance policy may include one or more of: a term life insurance policy; a permanent life insurance policy; and a universal life policy, and may have a benefit exceeding $100,000 United States (US) dollars.

The instructions may cause the processor to determine if the customer is entitled to temporary life insurance coverage prior to completion of the medical underwriting procedure if required by the life insurance policy. The instructions to generate the notification of insurance coverage and corresponding instructions may cause the processor to notify the customer of the temporary life insurance coverage. The instructions may cause the processor to deny the customer temporary coverage if one or more risk-assessment conditions are determined to be true based upon the information. The plurality of risk-assessment conditions may include conditions such as the customer having testing positive for human immunodeficiency virus (HIV), whether the customer is presently incarcerated, and/or whether the customer has had a myocardial infarction within three years of the date of application of the life insurance policy.

In another aspect, a non-transitory, tangible computer-readable medium storing machine readable instructions are described that, when executed by a processor, may cause the processor to: (1) generate a first plurality of fields via a web-based application; (2) select a life insurance policy for the customer that requires the customer to undergo a medical underwriting based upon information entered via the first plurality of fields; (3) generate a second plurality of fields via the web-based application; and (4) determine whether the customer is entitled to temporary life insurance coverage prior to completion of the medical underwriting procedure based upon information entered via the second plurality of fields. The machine readable instructions may include additional, less, or alternate functionality, including that discussed elsewhere herein.

The instructions may cause the processor to display a notification to the customer of the temporary life insurance coverage if the customer is entitled to the temporary life insurance coverage. The instructions may cause the processor to receive a premium payment from the customer for the selected life insurance policy, and the notification may be displayed after receiving the premium payment as a binding receipt of insurance coverage.

The information entered via the first plurality of fields may include one or more of: a body mass index of the customer, an age of the customer, and a life insurance benefit amount. The instructions may cause the processor to determine a risk class based upon the information and to associate the selected life insurance policy with a premium based upon the determined risk class. The instructions may cause the processor to display a rider and/or beneficiary information based upon the risk class determined from the information entered via the first plurality of fields. The rider may include a waiver of premium disability.

The instructions to generate the second plurality of fields may cause the processor to determine a customer's response to a first portion of the second plurality of fields; to determine whether additional answers are needed from the customer corresponding to a second portion of the second plurality of fields based upon customer's answers to the first portion of the second plurality of fields; and to generate the second portion of the second plurality of fields only when it is determined that additional answers are needed.

IX. Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain aspects are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some cases, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering aspects in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In aspects in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example aspects, the processor or processors may be located in a single location (e.g., within a home environment, an office environment or as a server farm), while in other aspects the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other example aspects, the one or more processors or processor-implemented modules may be distributed across a number of geographic locations.

Some portions of this specification are presented in terms of algorithms or symbolic representations of operations on data stored as bits or binary digital signals within a machine memory e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one aspect" or "an aspect" means that a particular element, feature, structure, or characteristic described in connection with the aspect is included in at least one aspect. The appearances of the phrase "in one aspect" in various places in the specification are not necessarily all referring to the same aspect.

Some aspects may be described using the expression "coupled" and "connected" along with their derivatives. For example, some aspects may be described using the term "coupled" to indicate that two or more elements are in direct physical or electrical contact. The term "coupled," however, may also mean that two or more elements are not in direct contact with each other, but yet still co-operate or interact with each other. The aspects are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, condition A or B is satisfied by any one of the following: A is true (or present) and B is false (or not present), A is false (or not present) and B is true (or present), and both A and B are true (or present).

In addition, use of the "a" or "an" are employed to describe elements and components of the aspects herein. This is done merely for convenience and to give a general sense of the description. This description should be read to include one or at least one and the singular also includes the plural unless it is obvious that it is meant otherwise.

Upon reading this disclosure, those of ordinary skill in the art will appreciate still additional alternative structural and functional designs for providing bound coverage via an online application process for various types of insurance coverage through the disclosed principles herein. Thus, while particular aspects and applications have been illustrated and described, it is to be understood that the disclosed aspects are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for generating a user interface for collecting customer information from a customer and binding insurance coverage to the customer, comprising:

displaying, via a display of a client computing device, a web-based application including at least the following portions of a single screen: (i) an input portion including a plurality of interactive fields for receiving customer information, and (ii) a summary portion including summary information regarding a life insurance policy;

receiving, by one or more processors, customer information entered via the input portion of the web-based application;

determining, by one or more processors, whether the life insurance policy requires a medical underwriting procedure in accordance with a rule-based conditional analysis that analyzes responses to a series of knockout questions that are presented sequentially in the input portion of the web-based application in an adaptive manner based upon one or more of: (i) the customer information, (ii) a type of the life insurance policy, or (iii) the customer's answers to previously-presented knockout questions;

receiving, at one or more processors, user input entered sequentially, in response to each knockout question of the series of knockout questions presented in the input portion of the web-based application;

in response to the user input received in response to each knockout question, (i) dynamically adjusting, by one or more processors, a premium associated with the life insurance policy based upon the user input and (ii) displaying, to the customer via the display of the client computing device, the dynamically adjusted premium in the summary portion of the web-based application; and providing, at the summary portion of the web-based application, a notification of binding insurance coverage based upon the user input received in response to the series of knockout questions.

2. The method of claim 1, wherein determining, by one or more processors, whether the life insurance policy requires a medical underwriting procedure includes:

evaluation of age, amount of insurance, and product; and if the series of knockout questions are answered by the customer in a satisfactory or negative manner, then the one or more processors may determine that the medical underwriting procedure is not required.

3. The method of claim 1, wherein the information entered via the input portion of the web-based application includes one or more of:

a desired type of life insurance policy;
a desired life insurance coverage;
risk assessment information;
beneficiary information; and
a customer signature.

4. The method of claim 3, wherein the life insurance policy includes one or more of:

a term life insurance policy;
a permanent life insurance policy; and
a universal life policy.

5. The method of claim 3, wherein the risk assessment information is related to having human immunodeficiency virus (HIV); being presently incarcerated; or having had a myocardial infarction within three years of the date of application of the life insurance policy.

6. The method of claim 1, wherein the life insurance policy has a benefit exceeding $100,000 United States (US) dollars.

7. The method of claim 1, further comprising:

determining, by one or more processors, if the customer is entitled to temporary or permanent life insurance coverage prior to completion of the medical underwriting procedure if required by the life insurance policy, and if so, automatically binding the life insurance policy via the web-based application.

8. A non-transitory, tangible computer-readable medium storing machine readable instructions that, when executed by a processor, cause the processor to:

display a web-based application including at least the following portions of a single screen: (i) an input portion including a plurality of interactive fields for receiving customer information, and (ii) a summary portion including summary information regarding a life insurance policy;

receive customer information entered via the input portion of the web-based application;

determine whether the life insurance policy requires a medical underwriting procedure in accordance with a rule-based conditional analysis that analyzes responses to a series of knockout questions that are presented sequentially in the input portion of the web-based application in an adaptive manner based upon one or more of: (i) customer information, (ii) a type of the life insurance policy, or (iii) the customer's answers to previously-presented knockout questions;

receive user input entered sequentially in response to each knockout question of the series of knockout questions presented in the input portion of the web-based application;

in response to the user input received in response to each knockout question, (i) dynamically adjust a premium associated with the life insurance policy based upon the user input and (ii) display the dynamically adjusted premium; and provide, at the summary portion of the web-based application, a notification of binding insurance coverage based upon the user input received in response to the series of knockout questions.

9. The non-transitory, tangible computer-readable medium of claim 8, wherein the information entered via the input portion of the web-based application includes one or more of:

a desired type of life insurance policy;
a desired life insurance coverage;
risk assessment information;
beneficiary information; and
a customer signature.

10. The non-transitory, tangible computer-readable medium of claim 8, wherein the life insurance policy includes one or more of:

a term life insurance policy;
a permanent life insurance policy; and
a universal life policy.

11. The non-transitory, tangible computer-readable medium of claim 8, wherein the life insurance policy has a benefit exceeding $100,000 United States (US) dollars.

12. The non-transitory, tangible computer-readable medium of claim 8, further including instructions, that when executed by the processor, cause the processor to:

determine if the customer is entitled to temporary life insurance coverage prior to completion of the medical underwriting procedure if required by the life insurance policy.

13. A computer-implemented method for generating a user interface for collecting customer information from a customer and binding insurance coverage to the customer, comprising:

displaying, via a display of a client computing device, a web-based application including at least the following portions of a single screen: (i) an input portion including a plurality of interactive fields for receiving customer information, and (ii) a summary portion including summary information regarding a life insurance policy;

generating, by one or more processors, a first plurality of interactive fields via the input portion of the web-based application;

receiving, by one or more processors, information entered at the first plurality of interactive fields of the input portion of the web-based application;

determining, by one or more processors, details associated with the life insurance policy for a customer, wherein the details include a premium associated with the life insurance policy;

generating, by one or more processors, a second plurality of interactive fields in the input portion of the web-based application based upon the details associated with the life insurance policy;

presenting, by one or more processors, the second plurality of interactive fields sequentially and in an adaptive manner based upon one or more of: (i) the customer information, (ii) a type of life insurance policy, or (iii) information entered within previously-presented fields from among the second plurality of fields;

receiving, at one or more processors, user input entered sequentially in response to the second plurality of interactive fields;

in response to the user input received, (i) dynamically adjusting, by one or more processors, the premium associated with the life insurance policy based upon the user input and (ii) displaying, the dynamically adjusted premium in the summary portion of the web-based application;

determining, by one or more processors, whether the customer is entitled to temporary life insurance coverage prior to completion of the medical underwriting procedure in accordance with a rule-based conditional analysis that analyzes information entered via the second plurality of interactive fields; and providing, at the summary portion of the web-based application, a notification of binding insurance coverage based upon the user input received in response to the second plurality of interactive fields.

14. The method of claim 13, wherein the notification includes the premium as adjusted based upon the user input entered sequentially in response to the second plurality of interactive fields.

15. The method of claim 13, further comprising:
receiving a premium payment from the customer for the selected life insurance policy, and
wherein the act of providing the notification comprises:
providing the notification after receiving the premium payment as a binding receipt of insurance coverage.

16. The method of claim 13, wherein the information entered via the first plurality of interactive fields comprises:
a body mass index of the customer, and further comprising:
determining a risk class based upon the information; and
associating the selected life insurance policy with the premium based upon the risk class.

17. The method of claim 13, wherein the information entered via the first plurality of interactive fields includes an age of the customer and a life insurance benefit amount, and further comprising:
displaying a rider based upon the information entered via the first plurality of fields.

18. The method of claim 17, wherein the act of displaying the rider comprises:
displaying a waiver of premium disability.

19. The method of claim 13, further comprising:
determining a risk class based upon the information entered via the first plurality of interactive fields; and
displaying beneficiary information based upon the risk class.

20. The method of claim 13, further comprising:
determining the customer's response to a first portion of the second plurality of interactive fields;
determining whether additional answers are needed from the customer corresponding to a second portion of the second plurality of interactive fields based upon the customer's answers to the first portion of the second plurality of interactive fields, and
wherein the act of presenting the second plurality of interactive fields comprises:
presenting the second portion of the second plurality of interactive fields only when it is determined that additional answers are needed.

* * * * *